United States Patent [19]

Tahara et al.

[11] Patent Number: 5,805,225
[45] Date of Patent: Sep. 8, 1998

[54] METHOD AND APPARATUS FOR VARIABLE RESOLUTION VIDEO PICTURE CODING/DECODING

[75] Inventors: Katsumi Tahara; Yoichi Yagasaki; Jun Yonemitsu, all of Kanagawa, Japan

[73] Assignee: Sony Corporation, Tokyo, Japan

[21] Appl. No.: 706,957

[22] Filed: Sep. 3, 1996

Related U.S. Application Data

[63] Continuation of Ser. No. 213,147, Mar. 15, 1994, abandoned.

[30]  Foreign Application Priority Data

Mar. 15, 1993  [JP]  Japan  .................................... 5-053945

[51] Int. Cl.⁶ ...................................................... H04N 7/24
[52] U.S. Cl. ........................................... 348/412; 348/409
[58] Field of Search ....................................... 348/384, 390, 348/405, 409, 412, 415, 419, 417, 410, 411, 413, 416, 420, 699; 382/232, 236, 238; H04N 7/130

[56]  References Cited

U.S. PATENT DOCUMENTS

| | | | |
|---|---|---|---|
| 5,010,401 | 4/1991 | Murakami et al. | 348/417 |
| 5,144,424 | 9/1992 | Savatier | 348/405 |
| 5,144,425 | 9/1992 | Joseph . | |
| 5,146,325 | 9/1992 | Ng | 348/384 |
| 5,185,819 | 2/1993 | Ng et al. | 348/412 |
| 5,198,901 | 3/1993 | Lynch | 348/419 |
| 5,231,486 | 7/1993 | Acampora et al. | 348/390 |
| 5,353,062 | 10/1994 | Maeda | 348/412 |
| 5,387,940 | 2/1995 | Kwok et al. | 348/415 |

FOREIGN PATENT DOCUMENTS

| | | |
|---|---|---|
| 0 424 026 | 4/1991 | European Pat. Off. . |
| 0598904 | 6/1994 | European Pat. Off. . |
| WO 92/10061 | 6/1992 | WIPO . |
| WO 92/16071 | 9/1992 | WIPO . |

OTHER PUBLICATIONS

Signal Processing. Image Communication, vol. 5, No. 1/2, Feb. 1993, Amsterdam NL pp. 185–198 Yu et al 'interlaced video coding with field–based multiresolution representation' par. 2–par. 3; figures 3,10.

IEEE Journal On Selected Areas In Communication, vol. 11, No. 1. Jan. 1993, New York US pp. 88–98 Siracusa et al 'flexible and robust packet transport for digital HDTV' par. 1–par. 4.

*Primary Examiner*—Richard Lee
*Attorney, Agent, or Firm*—Frommer Lawrence & Haug LLP; William S. Frommer

[57]  ABSTRACT

A picture series is encoded so that a first type of decoder having only one frame memory and incapable of bi-directional decoding can decode the encoded bitstream, and a second type of decoder having multiple frame memories and capable of bi-directional decoding can decode the encoded bitstream to produce a higher quality decoded picture series. The encoded bitstream comprises three parallel channels of encoded picture data. The first channel includes every other picture and header information common to the second and third channels. The second channel includes the pictures not represented in the first channel and encoded by one of forward and backward predictive coding. The third channel includes the pictures not represented in the first channel and encoded by bi-directional predictive coding. The first type of decoder uses the first and second channels, while the second type of decoder uses the first and third channels.

25 Claims, 23 Drawing Sheets

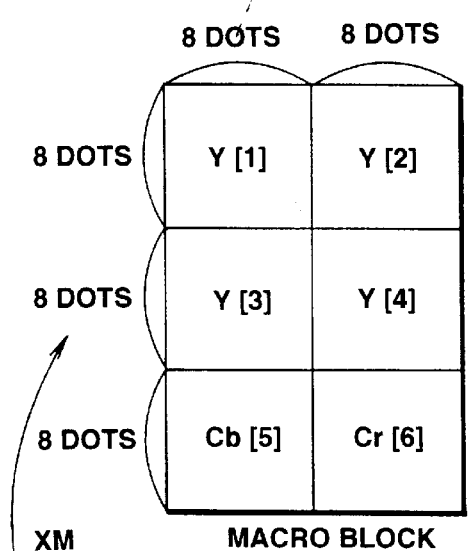
FIG.5C
(PRIOR ART)
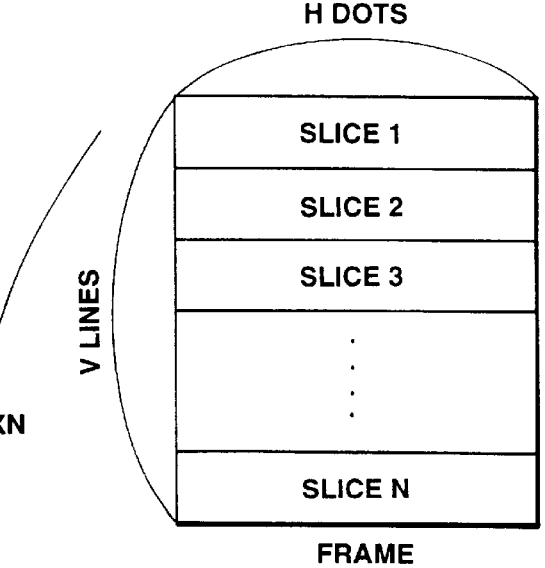
FIG.5A
(PRIOR ART)
FIG.5B
(PRIOR ART)

FRAME PREDICTION MODE

FIELD PREDICTION MODE

METHOD AND APPARATUS FOR VARIABLE RESOLUTION VIDEO PICTURE CODING/DECODING

This application is a continuation of application Ser. No. 08/213,147, filed Mar. 15, 1994 now abandoned.

BACKGROUND OF THE INVENTION

The present invention relates to encoding and decoding of picture signals, and, more particularly, is directed to compressing picture signals to form multiple streams of compressed data which can be decoded by decoders of varying capability and memory capacity.

In, for example, a teleconferencing system or a video telephone system, moving picture signals are compressed and encoded by taking advantage of intra-frame and inter-frame correlation so that they can be more efficiently transmitted over a communication channel to a remote location.

Intra-frame correlation can be utilized by an orthogonal transformation, such as a discrete cosine transformation (DCT).

Inter-frame correlation can be utilized by predictive encoding between successive pictures. As used herein, a picture generally refers to an image represented by a frame. When the fields of a frame are coded in a non-interlaced manner, that is, separately, each field may be referred to as a picture.

As shown in FIG. 1A, for example, frame pictures PC1, PC2 and PC3 are generated at time points t1, t2 and t3. As shown by shading in FIG. 1B, the difference between the frame pictures PC1 and PC2 is obtained as difference picture data PC12, and the difference between the frame pictures PC2 and PC3 is obtained as difference picture data PC23. Since there is a fairly small change between signals of temporally neighboring frames, transmission of only the difference picture data utilizes the transmission channel more efficiently than transmission of the original pictures. That is, using the difference picture data as encoded picture signals reduces the amount of data to be transmitted.

However, if only the difference signals are transmitted, the original picture cannot be restored. It is advantageous to occasionally transmit a picture which is not predictively encoded as a reference for difference picture data, and because it is sometimes more efficient than transmitting the picture as a predictively encoded picture.

Pictures which are encoded utilizing only intra-frame correlation and not inter-frame correlation, are referred to herein as intra-pictures or I-pictures.

Pictures which are encoded with predictive encoding relative to one previously encoded picture are referred to herein as predictive pictures or P-pictures. The previously encoded picture may be an I-picture or a P-picture, and temporally succeeds the P-picture.

Pictures which are encoded with predictive encoding relative to at most two pictures, a temporally preceding and a temporally succeeding picture, are referred to herein as bi-directionally predictive coded pictures or B-pictures. The two pictures may each be an I-picture or a P-picture. When both are used, the mean value of the two pictures is obtained and used as a reference picture for the picture to be encoded.

A series of pictures may be considered as groups of pictures having a predetermined number of frames such as F1 . . . F17. The luminance and chrominance picture signals of the leading frame F1 are encoded as an I-picture, the picture signals of the second frame F2 are encoded as a B-picture, and the picture signals of the third frame F3 are encoded as a P-picture. The fourth and the following frames F4 to F17 are encoded alternately as B-pictures and P-pictures. FIG. 2A shows the reference pictures used for encoding P-pictures, while FIG. 2B shows the reference pictures used for encoding B-pictures.

As shown in FIGS. 3A and 3B, there are four methods for encoding the macro-blocks (discussed below) of a picture. When multiple methods are suitable, the method which will give the smallest amount of encoded data is employed on a macro-block by macro-block basis. Blocks F1 to F5 in FIG. 3A represent data for frames of moving picture signals, whereas blocks F1X to F5X in FIG. 3B represent data for encoded frames. The solid line arrows in FIG. 3A show the frames to which motion vectors x1 . . . x6 relate.

The first method, shown as SP1, is to not use predictive encoding, that is, to use only intra-frame correlation. This is suitable for any macro-blocks of an I-picture, a P-picture and a B-picture. In other words, if less encoded data is produced without predictive encoding, then this method is selected.

The second method, shown as SP2, is to predictively encode relative to a picture which temporally succeeds the current picture, referred to as backward predictive encoding. The third method, shown as SP3, is to predictively encode relative to a picture which temporally precedes the current picture, referred to as forward predictive encoding. The second method is suitable for macro-blocks of only B-pictures. The third method is suitable for macro-blocks of P-pictures and B-pictures.

The fourth method, shown as SP4, is to predictively encode relative to the mean value of two pictures, one temporally preceding and one temporally succeeding the current picture. This method is suitable for macro-blocks of only B-pictures.

The encoding sequence will now be described.

The first frame F1 is encoded as an I-picture using the first method SP1 so that it is directly transmitted over a transmission channel as encoded data F1X.

The third frame F3 is encoded as a P-picture. When the third method SP3, forward predictive coding, is used for a macro-block, difference signals from the temporally preceding frame F1 used as the reference picture, as indicated by a broken-line arrow SP3, and a motion vector x3 between the reference picture F1 and the current picture F3, are calculated and encoded as data F3X for that macro-block. Alternatively, in this or another macro-block of the P picture, if a smaller amount of encoded data is produced for a macro-block of the P picture being encoded, the first method SP1 can be used wherein the data of the original frame F3 are directly utilized as the transmission data F3X for that macro-block.

The second frame F2 is encoded as a B-picture.

When the fourth method SP4 is used to encode a macro-block of the frame F2, a difference between the mean value of the temporally preceding frame F1 and the temporally succeeding frame F3 is calculated, on a pixel by pixel basis. The difference data and the motion vectors x1 and x2 are encoded as data F2X.

When the first processing method SP1 is used to encode a macro-block of the frame F2, the data of the original frame F2 forms the encoded data F2X.

When one of the second or third methods SP2, SP3 is used to encode a macro-block of the frame F2, one of the difference between the temporally succeeding frame F3 and the current frame F2, and the difference between the temporally preceding frame F1 and the current frame F2 is calculated. The difference data and one of the motion vectors x1, x2 are encoded as the data F2X.

The frame F4 for the B-picture and the frame F5 for the P-picture are processed in a similar manner as described above to generate transmitted data F4X and F5X.

FIG. 4 illustrates an arrangement for encoding and decoding moving picture signals in accordance with the above-described predictive encoding scheme. As shown in FIG. 4, an encoding device 1 encodes input picture signals and transmits the encoded signals to a recording medium 3 as a transmission channel for recording. A decoding device 2 reproduces the signals recorded on the recording medium 3 and decodes these as output signals.

The encoding device 1 includes an input terminal 10, a pre-processing circuit 11, A/D converters 12 and 13, a frame memory 14 including a luminance signal frame memory 15 and a color difference signal frame memory 16, a format converting circuit 17 and an encoder 18.

Input terminal 10 is adapted to receive a video signal VD and to supply the signal VD to pre-processing circuit 11 which functions to separate the video signal VD into luminance signals and color signals, herein chrominance or color difference signals, that are applied to analog-to-digital (A/D) converters 12 and 13, respectively. The video signals, digitized by analog-to-digital conversion by the A/D converters 12 and 13, are supplied to frame memory 14 having memories 15, 16 which function to store the luminance signals and the color difference signals, respectively, and to read out the signals stored therein to format converting circuit 17.

The converter 17 is operative to convert frame format signals stored in the frame memory section 14 into block format signals. As shown in FIG. 5A, pictures are stored in the frame memory section 14 as frame-format data having V lines each consisting of H dots. The converting circuit 17 divides each frame into N slices, each slice comprising a multiple of 16 lines. As shown, in FIG. 5B, the converter 17 divides each slice into M macro-blocks. As shown in FIG. 5C, each macro-block represents luminance signals Y corresponding to 16×16 pixels or dots, and associated chrominance Cr, Cb signals. These luminance signals are subdivided into blocks Y1 to Y4, each consisting of 8×8 dots. The 16×16 dot luminance signals are associated with 8×8 dot Cb signals and 8×8 dot Cr signals. The converter 17 is also operative to supply the block format signals to the encoder 18, which is described in detail below with reference to FIG. 6.

The encoder 18 operates to encode the block format signals and to supply the encoded signals as a bitstream over a transmission channel for recording on the recording medium 3.

The decoding device 2 includes a decoder 31, a format converting circuit 32, a frame memory section 33 including a luminance signal frame memory 34 and a color difference signal frame memory 35, digital-to-analog converters 36 and 37, a post-processing circuit 38 and an output terminal 30.

The decoder 31 is operative to reproduce encoded data from the recording medium 3 and to decode the encoded data, as described in detail below with reference to FIG. 9, and to supply decoded data signals to format converting circuit 32 which is operative to convert the decoded data signals into frame format data signals and to supply the frame format data signals as luminance signals and color difference signals to the memory 33. The memories 34, 35 of the memory 33 function to store the luminance and chrominance signals, respectively, and to apply these signals to D/A converters 36 and 37, respectively. The analog signals from converters 36, 37 are synthesized by a post-processing circuit 38 which functions to form output picture signals and to output them to output terminal 30, and thence to a display unit, such as a CRT, not shown, for display.

FIG. 6 illustrates the encoder 18 shown in FIG. 4.

Generally, the encoder 18 stores three pictures, the current picture and the pictures temporally preceding and succeeding the current picture. Based on the sequential position of the current picture in the group of pictures, the picture coding type (I, P or B) is selected for each picture.

The encoder 18 also chooses one of frame-based and field-based predictive encoding as will be explained with reference to FIGS. 7A, 7B and further chooses one of frame-based and field-based DCT encoding as will be explained with reference to FIGS. 8A, 8B. For each picture, appropriate motion vectors are obtained and the picture is predictively encoded relative to zero, one or two previously encoded pictures which have been locally decoded and which are referred to as reference pictures to form a difference data signal. The difference data signal is orthogonally transformed into blocks of coefficient data which are quantized, variable length encoded and transmitted as encoded data.

At the encoder 18, the quantized data are dequantized, inverse orthogonally transformed, and stored as the reference pictures. The predictive encoding applies the motion vector(s) obtained for the current picture to the reference picture(s) to produce a prediction picture which is subtracted from the current picture to yield the difference data.

The elements of the encoder 18 will now be explained in detail.

Picture data for encoding is supplied macro-block by macro-block to an input terminal 49 and thence to a motion vector detection circuit 50 which is operative to process the picture data of respective frames as I-pictures, P-pictures or as B-pictures, in accordance with a predetermined sequence for each group of pictures, as shown for example, in FIGS. 2A, 2B. The circuit 50 applies the picture data of the current frame to a frame memory 51 having frame memories 51a, 51b, 51c used for storing a temporally preceding picture, the current picture and a temporally succeeding picture, respectively.

More specifically, the frames F1, F2, F3 are stored in the memories 51a, 51b, 51c, respectively. Then the picture stored in memory 51c is transferred to memory 51a. The frames F4, F5 are stored in the memories 51b, 51c, respectively. The operations of transferring the picture in memory 51c to memory 51a and storing the next two pictures in memories 51b, 51c are repeated for the remaining pictures in the group of pictures.

After the pictures are read into the memory and temporarily stored, they are read out and supplied to a prediction mode changeover circuit 52 which is adapted to process the current picture for one of frame based and field based predictive encoding. After processing the first frame picture data in a group of pictures as an I-picture and before processing the second frame picture as a B-picture, the motion vector detection circuit 50 processes the third frame P-picture. The processing sequence is different from the sequence in which the pictures are supplied because the B-picture may involve backward prediction, so subsequent decoding may require that the P-picture temporally succeeding the B-picture have been previously decoded.

The motion vector detection circuit 50 calculates as an estimated value for intra-coding for each macro-block, the sum of absolute values of prediction errors for the frame prediction mode for each macro-block and the sum of absolute values of prediction errors for the field prediction mode for each macro-block and supplies these sums to the prediction decision circuit 54 which compares these sums and selects frame prediction mode or field prediction mode in accordance with the smallest of these values and provides the selected mode to the prediction mode changeover circuit 52.

If the frame prediction mode is selected, the prediction mode changeover circuit 52 outputs the four luminance blocks Y1 to Y4 and the two chrominance or color difference blocks Cb, Cr of each macro-block received from the motion vector detection circuit 50 without processing. As shown in FIG. 7A, odd or first field line data, indicated by solid lines, and even or second field line data, indicated by dashed lines, alternate in each luminance and color difference block as received from the motion vector detection circuit 50. In FIG. 7A, a indicates units for motion compensation. In the frame prediction mode, motion compensation is performed with four luminance blocks (macro-blocks) as a unit and a single motion vector is associated with the four luminance blocks Y1 to Y4.

If the field prediction mode is selected, the prediction mode changeover circuit 52 processes the signals received from the motion vector detection circuit 50 so that each of the four luminance blocks comprises data from a single field and the two color difference blocks have non-interlaced odd and even field data. Specifically, as shown in FIG. 7B, the luminance blocks Y1 and Y2 have odd-field data and the luminance blocks Y3 and Y4 have even-field data, while the upper halves of the color difference blocks Cb, Cr represent odd field color difference data for the luminance blocks Y1 and Y2 and the lower halves of the color difference blocks Cb, Cr represent even field color difference data for the luminance blocks Y3 and Y4. In FIG. 7B, b indicates units for motion compensation. In the field prediction mode, motion compensation is performed separately for the odd-field blocks and even-field blocks so that one motion vector is associated with the two luminance blocks Y1 and Y2 and another motion vector is associated with the two luminance blocks Y3 and Y4.

The prediction mode changeover circuit 52 supplies the current picture, as processed for frame based or field based predictive encoding, to arithmetic unit 53 of FIG. 6. The arithmetic unit 53 functions to perform one of intra-picture prediction, forward prediction, backward prediction or bi-directional prediction. A prediction decision circuit 54 is adapted to select the best type of prediction in dependence upon the prediction error signals associated with the current picture signals.

The motion vector detection circuit 50 calculates, for the current picture, the sum of absolute values of the differences between each Aij and the average value of the Aij in each macro-block $\Sigma|Aij-(\text{average of Aij})|$ and supplies the sum as an estimated value for intra-coding to the prediction decision circuit 54.

The motion vector detection circuit 50 calculates the sum of absolute values (or sum of squares) of the difference (Aij–Bij) between signals Aij of the macro-blocks of the current picture, and signals Bij of the macro-blocks of the prediction picture $\Sigma|Aij-Bij|$ in each of frame prediction mode and field prediction mode. As explained above, the motion vector(s) for the current picture are applied to the reference picture(s) to generate the prediction picture. When the reference picture temporally precedes the current picture, the quantity $\Sigma|Aij-Bij|$ is referred to as a forward prediction error signal, and when the reference picture temporally succeeds the current picture, the quantity $\Sigma|Aij-Bij|$ is referred to as a backward prediction error signal. When the prediction picture is the mean of a temporally preceding and a temporally succeeding reference picture, as motion-compensated, the quantity $\Sigma|Aij-Bij|$ is referred to as a bi-directional prediction error signal.

The circuit 50 supplies the forward frame prediction, the forward field prediction, the backward frame prediction, the backward field prediction, the bi-directional frame prediction and the bi-directional field prediction error signals to the prediction decision circuit 54.

The prediction decision circuit 54 selects one of intra-coding, forward inter-picture prediction, backward inter-picture prediction or bi-directional inter-picture prediction and one of frame and field prediction mode in accordance with the smallest of the estimated value for intra-coding and the forward frame, the forward field, the backward frame, the backward field, the bi-directional frame and the bi-directional field prediction error signals. The arithmetic unit 53 predictively encodes the current picture, as processed by the frame or field changeover circuit 52, in accordance with the prediction mode selected by the prediction decision circuit 54.

The motion vector detection circuit 50 serves to calculate and supply the motion vector(s) associated with the selected prediction mode to a variable length encoding circuit 58 and a motion compensation circuit 64, explained later.

The sums of the absolute values of the inter-frame differences (prediction errors) on the macro-block basis are supplied from the motion vector detection circuit 50 to the prediction mode changeover circuit 52 and to the prediction decision circuit 54, in the manner as described above.

The arithmetic unit 53 supplies predictively encoded data, also referred to as difference data, for the current picture to a DCT mode changeover circuit 55 which is adapted to process the current picture for one of frame based and field based orthogonal transformation.

The DCT changeover circuit 55 functions to compare the encoding efficiency when the DCT operations for the macro-blocks in a picture are performed with the odd field data alternating with the even field data, that is, for frame based orthogonal transformation, as shown in FIG. 8A, with the encoding efficiency when the DCT operations for the macro-blocks in a picture are performed with the odd field data separated from the even field data, that is, for field based orthogonal transformation, as shown in FIG. 8B. The circuit 55 functions to select the mode with the higher encoding efficiency.

To evaluate the encoding efficiency for frame based orthogonal transformation, the DCT mode changeover circuit 55 places the luminance macro-block data into interlaced form, as shown in FIG. 8A, and calculates the differences between the odd field line signals and even field line signals vertically adjacent to each other, and finds the sum of absolute values of the differences EFM, or the sum of squared values of the differences.

$$EFM = \sum_{j=1}^{16} \sum_{i=1}^{16} |o(i,j) - e(i,j)| + \sum_{j=1}^{16} \sum_{i=1}^{15} |e(i,j) - o(i+1,j)| \quad \text{Eq. 1}$$

To evaluate the encoding efficiency for field based orthogonal transformation, the DCT mode changeover circuit 55 places the luminance macro-block data into non-interlaced form, as shown in FIG. 8B, and calculates the differences between vertically adjacent odd field line signals and the differences between vertically adjacent even field line signals, and finds the sum of absolute values of the differences EFD, or the sum of squared values of the differences.

$$EFD = \sum_{j=1}^{16} \sum_{i=1}^{15} (|o(i,j) - o(i+1,j)| + |e(i,j) - e(i+1,j)|) \quad \text{Eq. 2}$$

The DCT changeover circuit 55 compares the difference between the frame based and field based sums of the absolute values with a predetermined threshold and selects frame based DCT transformation if the difference EFM–EFD is less than the predetermined threshold.

If the frame prediction mode is selected in the prediction mode changeover circuit 52, the probability is high that the frame DCT mode will be selected in the DCT mode changeover circuit 55. If the field prediction mode is selected in the prediction mode changeover circuit 52, the probability is high that the field DCT mode will be selected in the DCT mode changeover circuit 55. However, since this is not necessarily the case, the prediction mode changeover circuit 52 sets the mode which will give the least value of the sum of the absolute values of prediction errors, while the DCT mode changeover circuit 55 sets the mode which will give the optimum orthogonal transformation encoding efficiency.

If frame based orthogonal transformation mode, also referred to as frame DCT mode, is selected, the DCT mode changeover circuit 55 functions to ensure that the four luminance blocks Y1 to Y4 and two color difference blocks Cb, Cr represent alternating or interlaced odd and even field lines, as shown in FIG. 8A.

If field based orthogonal transformation mode, also referred to as field DCT mode, is selected, the DCT mode changeover circuit 55 functions to ensure that each of the luminance blocks represents only one field, and that each of the color difference blocks has segregated or non-interlaced odd and even field lines, as shown in FIG. 8B.

The DCT mode changeover circuit 55 functions to output the data having the configuration associated with the selected DCT mode, and to output a DCT flag indicating the selected DCT mode to the variable length encoding circuit 58 and the motion compensation circuit 64.

The DCT mode changeover circuit 55 supplies appropriately configured difference picture data to a DCT circuit 56 shown in FIG. 6 which is operative to orthogonally transform it using a discrete cosine transformation into DCT coefficients, and to supply the DCT coefficient data to a quantization circuit 57 that functions to quantize the coefficient data with quantization steps selected in accordance with the volume of data stored in a transmission buffer 59 and to supply quantized data to a variable length encoding circuit 58.

The variable length encoding circuit 58 is also supplied with the quantization step or scale data from the quantization circuit 57, prediction mode data from the prediction decision circuit 54, that is data indicating which of the intra-picture prediction, forward prediction, backward prediction or bi-directional prediction is used, and motion vector data from the motion vector detection circuit 50. The encoding circuit 58 also receives prediction flag data from the prediction decision circuit 54 comprising a flag indicating which of the frame prediction mode or the field prediction mode is used, and prediction flag data from the DCT mode changeover circuit 55 comprising a flag indicating which of the frame DCT mode or the field DCT mode is used. This information is placed into the header portion of the encoded data stream.

The variable length encoding circuit 58 serves to encode the quantized data and the header information using a variable length code such as a Huffman code, in accordance with the quantization step data supplied from the quantization circuit 57, and to output the resulting data to a transmission buffer 59.

The quantized data and quantization step are also supplied to a dequantization circuit 60 which serves to dequantize the quantized data using the quantization step, and to supply the recovered DCT coefficient data to an inverse DCT circuit 61 that functions to inverse transform the DCT coefficient data to produce recovered difference data and to supply the recovered difference data to an arithmetic unit 62.

The arithmetic unit 62 combines the recovered difference data with a previously encoded and decoded reference picture, as motion compensated, to produce decoded data for a reconstructed picture which will be used as a reference picture and which is read into one of two frame memories 63a, 63b. The memories 63a, 63b are adapted to read out the reference picture data stored therein to a motion compensation circuit 64 that uses the motion vectors from the motion vector detection circuit 50 to produce a prediction picture from the reference picture. Specifically, the circuit 50 uses the motion vector to alter the readout address of the reference picture from the memory 63a or 63b.

For a group of pictures, after the first frame I-picture data and the third frame P-picture data are stored in the forward and backward prediction picture memories or units 63a, 63b, respectively, the second frame B-picture data is processed by the motion vector detection circuit 50. The prediction decision circuit 54 selects the frame or field prediction mode, while setting the prediction mode to one of intra-frame prediction mode, forward prediction mode, backward prediction mode and bi-directional prediction mode in correspondence with the sum of absolute values of predictive errors by macro-block.

Since a reconstructed B-picture is not used as a reference picture for other pictures, it is not stored in the frame memory 63.

It will be appreciated that the frame memory 63 has its forward and backward prediction picture units 63a1, 63b bank-exchanged as needed so that a picture stored in one of the units 63a or 63b can be outputted as either a forward or a backward prediction picture.

The motion compensation circuit 64 functions to supply the motion compensated data as a prediction picture to the arithmetic unit 62 and to the arithmetic unit 53 which subtracts the prediction picture from the P-picture or the B-picture currently being predictively encoded.

More specifically, when the motion vector detection circuit 50 receives picture data for an I-picture from the forward original picture unit 51a, the prediction decision circuit 54 selects the intra-frame prediction mode and sets a switch 53d of the arithmetic unit 53 to an input contact a. This causes the I-picture data to be inputted directly to the DCT mode changeover circuit 55. In this case, no prediction picture is expected from the motion compensation circuit 64. The I-picture data is also supplied to the forward prediction picture unit 63a.

When the forward prediction mode is selected by the prediction decision circuit 54, the circuit 54 also sets the switch 53d to an input contact b which causes the arithmetic unit 53a to subtract the prediction picture, produced by the motion compensation circuit 64, from the picture read out from the memory 51, for each macro-block on a pixel by pixel basis, to produce difference data. The P-picture, after encoding and local decoding, is supplied to one of the units 63a, 63b. For example, if the P-picture immediately follows an I-picture, then the P-picture is stored in the backward prediction picture unit 63b.

For forward predictive encoding, the prediction picture is a reference I-picture or P-picture read out from the forward prediction picture unit 63a of the frame memory 63 and motion-compensated by the motion compensation circuit 64 in accordance with the motion vector outputted from the motion vector detection circuit 50. More specifically, for each macro-block, the motion compensation circuit 64 shifts the readout address of the forward prediction picture unit 63a in an amount corresponding to the motion vector currently output by the motion vector detection circuit 50.

When the backward prediction mode is selected by the prediction decision circuit 54, the circuit 54 also sets the switch 53d to an input contact c which causes the arithmetic unit 53b to subtract the prediction picture, produced by the motion compensation circuit 64, from the picture read out from the memory 51, on a pixel by pixel basis, to produce difference data.

For backward predictive encoding, the prediction picture is a P-picture read out from the backward prediction picture unit 63b of the frame memory 63 and motion-compensated by the motion compensation circuit 64 in accordance with the motion vector outputted from the motion vector detection circuit 50. More specifically, for each macro-block, the motion compensation circuit 64 shifts the readout address of the backward prediction picture unit 63b in an amount corresponding to the motion vector currently output by the motion vector detection circuit 50.

When the bi-directional prediction mode is selected by the prediction decision circuit 54, the circuit 54 sets the switch 53d to an input contact d which causes the arithmetic unit 53c to subtract a prediction picture from the picture read out from the memory 51, on a pixel by pixel basis, to produce difference data. The prediction picture is the mean value of a forward prediction picture and a backward prediction picture.

In the case of bi-directional prediction, the picture stored in the forward prediction picture unit 63a, and the picture stored in the backward prediction picture unit 63b, are read out and motion-compensated by the motion compensation circuit 64 in dependence upon the motion vectors outputted from the motion vector detection circuit 50. More specifically, for each macro-block, the motion compensation circuit 64 shifts the readout address of the forward and backward prediction picture units 63a, 63b in an amount corresponding to the appropriate one of the motion vectors currently output by the motion vector detection circuit 50.

The transmission buffer 59 temporarily stores the data supplied thereto, generates control data indicating the volume of data stored therein and supplies the control data to the quantization circuit 57. When the volume of data stored in the transmission buffer 59 reaches a predetermined upper limit value, the control data from the transmission buffer 59 causes the quantization scale of the quantization circuit 57 to increase so as to decrease the volume of the quantized data. Similarly, when the volume of data stored in the transmission buffer 59 reaches a predetermined lower limit value, the control data from the transmission buffer 59 causes the quantization scale of the quantization circuit 57 to decrease so as to increase the volume of the quantized data. In this manner, the transmission buffer 59 prevents the data supplied thereto from overflowing or underflowing its capacity. The data stored in the transmission buffer 59 are read out at a predetermined timing to an output terminal 69 and thence to a transmission channel for recording on, for example, the recording medium 3.

Although the foregoing description has been made with reference mainly to the luminance blocks, the color difference blocks are similarly processed and transmitted using the motion vector which corresponds to the motion vector of the luminance block halved in both the vertical and horizontal directions.

FIG. 9 illustrates the decoder 31 shown in FIG. 4.

The reproduced encoded picture data transmitted from the recording medium 3 is applied to a reception circuit, not shown, or to an input terminal 80 which applies the encoded picture data to a reception buffer 81 that serves to temporarily store the encoded picture data and to supply this data to a variable length decoding circuit 82 of a decoding circuit 90.

The variable length decoding circuit 82 functions to variable length decode the encoded data, to output the recovered motion vector, prediction mode data, prediction flags and DCT flags to the motion compensation circuit 87, and to output the quantization step data and variable length decoded picture data, including the predictive mode, the motion vector, the predictive flag, the DCT flag and the quantized picture data for each macro-block, to an inverse quantization circuit 83.

The inverse quantization circuit 83 is adapted to dequantize the picture data supplied from the variable length decoding circuit 82 in accordance with the quantization step data supplied from the variable length decoding circuit 82 and to output the thus recovered coefficient data to an inverse transformation IDCT circuit 84.

The IDCT circuit 84 is adapted to perform an inverse transformation on the recovered coefficient data to produce recovered difference data, and to supply the recovered difference data to an arithmetic unit 85.

If the recovered difference data supplied from the IDCT circuit 84 represents an I-picture, the arithmetic unit 85 does not process the data and simply supplies it through an output terminal 91 to the format converting circuit 32 shown in FIG. 4, and to a forward prediction picture unit 86a of a frame memory 86.

If the recovered difference data supplied from the IDCT circuit 84 represents a macro-block of a P-picture produced in the forward prediction mode, then the reference picture data of the preceding frame, as stored in the forward prediction picture memory 86a of the frame memory 86, is read and motion-compensated by a motion compensation circuit 87 in dependence upon the motion vector outputted from the variable length decoding circuit 82 to generate a prediction picture. Specifically, the motion compensation circuit 87 uses the motion vector to alter the read out address supplied to the memory 86a. The arithmetic unit 85 adds the prediction picture to the recovered difference data to produce a decoded or reconstructed picture which is stored in a backward prediction picture memory 86b of the frame memory 86. The decoded P-picture is retained in the decoder 31, and output after the next B-picture is decoded and output, so as to restore the pictures to the order in which they were supplied to the encoder 18 of FIG. 4.

Even if the macro-block of the P-picture was encoded as intra-coded mode data, the decoded P-picture is directly stored in the backward prediction picture unit 86b, without being output to the output terminal 91 by the arithmetic unit 85.

If the recovered difference data supplied from the IDCT circuit 84 represents a macro-block of a B-picture encoded in the intra-coding mode, as determined from the prediction mode supplied from the variable length decoding circuit 82 to the motion compensation circuit 87, a prediction picture is not generated.

If the recovered difference data supplied from the IDCT circuit 84 represents a macro-block of a B-picture encoded in the forward prediction mode, as determined from the prediction mode supplied from the variable length decoding circuit 82 to the motion compensation circuit 87, the data stored in the forward prediction picture unit 86a of the frame memory 86 is read out and motion compensated by the motion compensation circuit 87 using the motion vector supplied from the variable length decoding circuit 82 to form the prediction picture. The arithmetic unit 85 sums the recovered difference data with the prediction picture to form the recovered B-picture.

If the recovered difference data supplied from the IDCT circuit 84 represents a macro-block of a B-picture encoded in the backward prediction mode, as determined from the prediction mode supplied from the variable length decoding circuit 82 to the motion compensation circuit 87, the data stored in the backward prediction picture unit 86b is read out and motion compensated by the motion compensation circuit 87 using the motion vector supplied from the variable length decoding circuit 82 to form the prediction picture. The arithmetic unit 85 sums the recovered difference data with the prediction picture to form the recovered B-picture.

If the recovered difference data supplied from the IDCT circuit 84 represents a macro-block of a B-picture encoded in the bi-directional prediction mode, as determined from the prediction mode supplied from the variable length decoding circuit 82 to the motion compensation circuit 87, the data stored in both the forward and backward prediction picture memories 86a, 86b are read out and respectively motion compensated by the motion compensation circuit 87 using the motion vectors supplied from the variable length decoding circuit 82, then averaged to form the prediction picture. The arithmetic unit 85 sums the recovered difference data with the prediction picture to form the recovered B-picture.

The recovered B-picture is supplied via the output terminal 91 to the format converting circuit 32. However, since the B-picture is not utilized for generating a prediction picture for other pictures, it is not stored in the frame memory 86.

After outputting of the B-picture, picture data of the P-picture stored in the backward prediction picture unit 86b is read and supplied via the motion compensation circuit 87 to the arithmetic unit 85. Motion compensation is not performed at this time.

The counterpart circuits to the prediction mode changeover circuit 52 and the DCT mode changeover circuit 55 in the encoder 18 of FIG. 6 are not shown in the decoder 31. The processing to be performed by these circuits, that is, the processing for restoring the configuration in which odd-field line signals and even-field line signals are separated from each other to the configuration in which odd and even-field line signals alternate with each other, is performed by the motion compensation circuit 87.

The processing of the luminance signals has been explained in the foregoing. As will be appreciated by one of ordinary skill in the art, the processing of the color difference signals is carried out in a similar manner. However, the motion vector employed in such case is the motion vector for luminance signals which is halved in both the vertical and horizontal directions.

With the above-described conventional encoding and decoding methods for picture signals it is possible to make bi-directional prediction using two reference prediction pictures but the required memory capacity is relatively large. It has been recognized that, if prediction is limited to the forward or backward prediction using a single reference prediction picture, it is possible to reduce the memory capacity, however, the recovered picture quality is also reduced.

The conventional encoding and decoding methods also have the drawback that a decoder for a bitstream generated using bi-directional prediction cannot decode a bitstream generated using only forward or backward prediction.

OBJECTS AND SUMMARY OF THE INVENTION

Therefore, an object of the present invention is to provide an encoding and decoding method and apparatus for picture signals which avoids the aforementioned disadvantages of the prior art.

Another object of the present invention is to provide an encoded bitstream which can be decoded by a decoder having a single reference picture memory capacity, and can also be decoded by another decoder having memory capacity for two pictures to produce higher quality decoded pictures than are produced by the decoder of smaller memory capacity.

A further object of the present invention is to provide an encoded bitstream which can be decoded by a decoder which is not capable of bi-directional decoding, and can also be decoded by another decoder capable of bi-directional decoding to produce higher quality decoded pictures than are produced by the decoder not capable of bi-directional decoding.

Yet another object of the present invention is to provide an efficiently encoded bitstream which represents a series of pictures.

In accordance with an aspect of this invention, a method and apparatus for transmitting groups of picture signals encode a first portion of the groups of picture signals by forward predictive encoding with reference to a preceding picture signal in the first portion to generate a first bitstream, and encode the picture signals in the groups of picture signals which are not included in the first portion by one of forward and backward predictive encoding with reference to the picture signals in the first portion to generate a second bitstream. The first and second bitstreams are transmitted in parallel.

In accordance with another aspect of this invention, the picture signals in the groups of picture signals which are not included in the first portion are also encoded by bi-directional predictive encoding with reference to the picture signals in the first portion to generate a third bitstream that is transmitted in parallel with the first and second bitstreams.

In accordance with an aspect of the present invention, the first and second encoded bitstreams form first and second encoded picture signals. The first and second encoded picture signals are combined. The first encoded picture signals are decoded by forward predictive decoding with reference to a preceding decoded picture signal decoded from the first encoded picture signals to generate first decoded picture signals, and the second encoded picture signals are decoded by one of forward and backward predictive decoding with reference to the first decoded picture signals to generate second decoded picture signals.

In accordance with another aspect of this invention, the third encoded bitstream forms third encoded picture signals which are combined with the first encoded picture signals, and the third encoded picture signals are then decoded by bi-directional predictive decoding with reference to said decoded picture signals to generate third decoded picture signals.

A first type of decoder for the first and second bitstreams needs a memory having a capacity of only one picture frame, and which need not be capable of bi-directional predictive decoding.

A second type of decoder for the first and third bitstreams needs a memory having a capacity of two picture frames, and must be capable of bi-directional predictive decoding. However, the second type of decoder produces higher quality decoded pictures than the first type of decoder.

Thus, the present invention permits decoder interchangeability as picture signals encoded according to the present invention can be decoded by decoders having different memory capacities and complexities.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIGS. 5A, 5B and 5C diagram are referred to in explaining the operation of the format converting circuit shown in FIG. 4;

DETAILED DESCRIPTION OF THE PREFERRED EMBODIMENTS

The present invention encodes a series of pictures so that a first type of decoder having only one frame memory and incapable of bi-directional decoding and backward predictive decoding can decode the encoded bitstream, and a second type of decoder having multiple frame memories and capable of bi-directional decoding and backward predictive decoding can decode the encoded bitstream to produce a higher quality decoded picture series.

The encoded bitstream comprises three parallel channels of encoded picture data. The first channel includes every other picture and header information common to the second and third channels. The second channel includes the pictures not represented in the first channel and encoded by one of forward and backward predictive coding. It will be appreciated that a picture encoded by forward or backward predictive coding may include macro-blocks encoded by intra-coding. The third channel includes the pictures not represented in the first channel and encoded by bi-directional predictive coding. It will be appreciated that a picture encoded by bi-directionally predictive coding may include macro-blocks encoded by intra-coding, forward predictive coding or backward predictive coding. The first type of decoder uses the first and second channels, while the second type of decoder uses the first and third channels. Thus, a bitstream according to the present invention permits decoder interchangeability.

Figure 10:
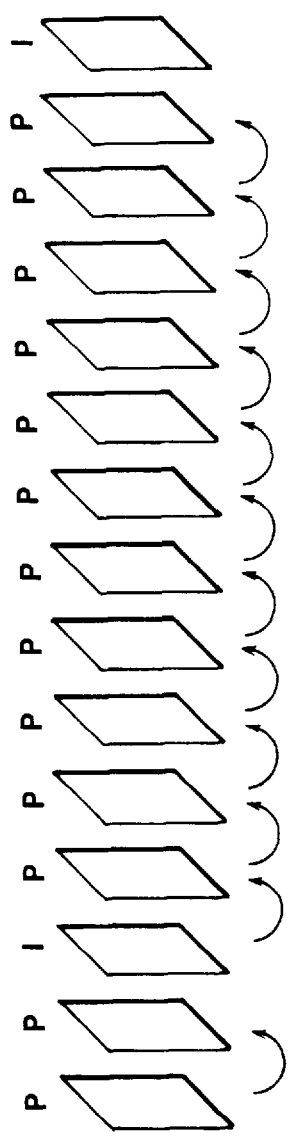
FIG. 10 is a chart referred to in explaining forward prediction in the present invention.

FIG. 10 shows a picture sequence in which only forward prediction is used and the inter-picture distance is equal to unity. Only a single reference picture temporally preceding the current picture is required. That is, the picture sequence comprises only I-pictures and P-pictures, with the P-pictures obtained only by forward prediction. It will be appreciated that only one picture memory is needed to encode and decode this sequence.

Figures 1A, 1B:
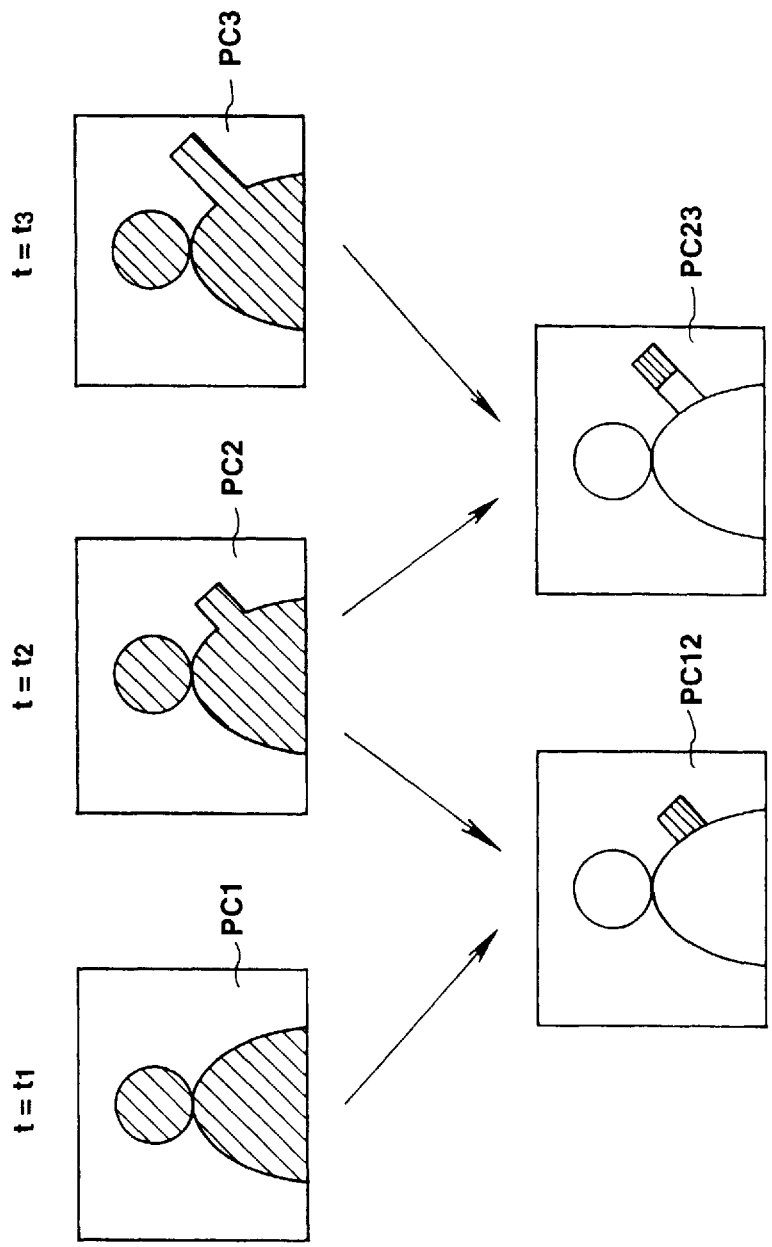
FIGS. 1A and 1B are picture illustrating inter-frame correlation.
Figures 2A, 2B:
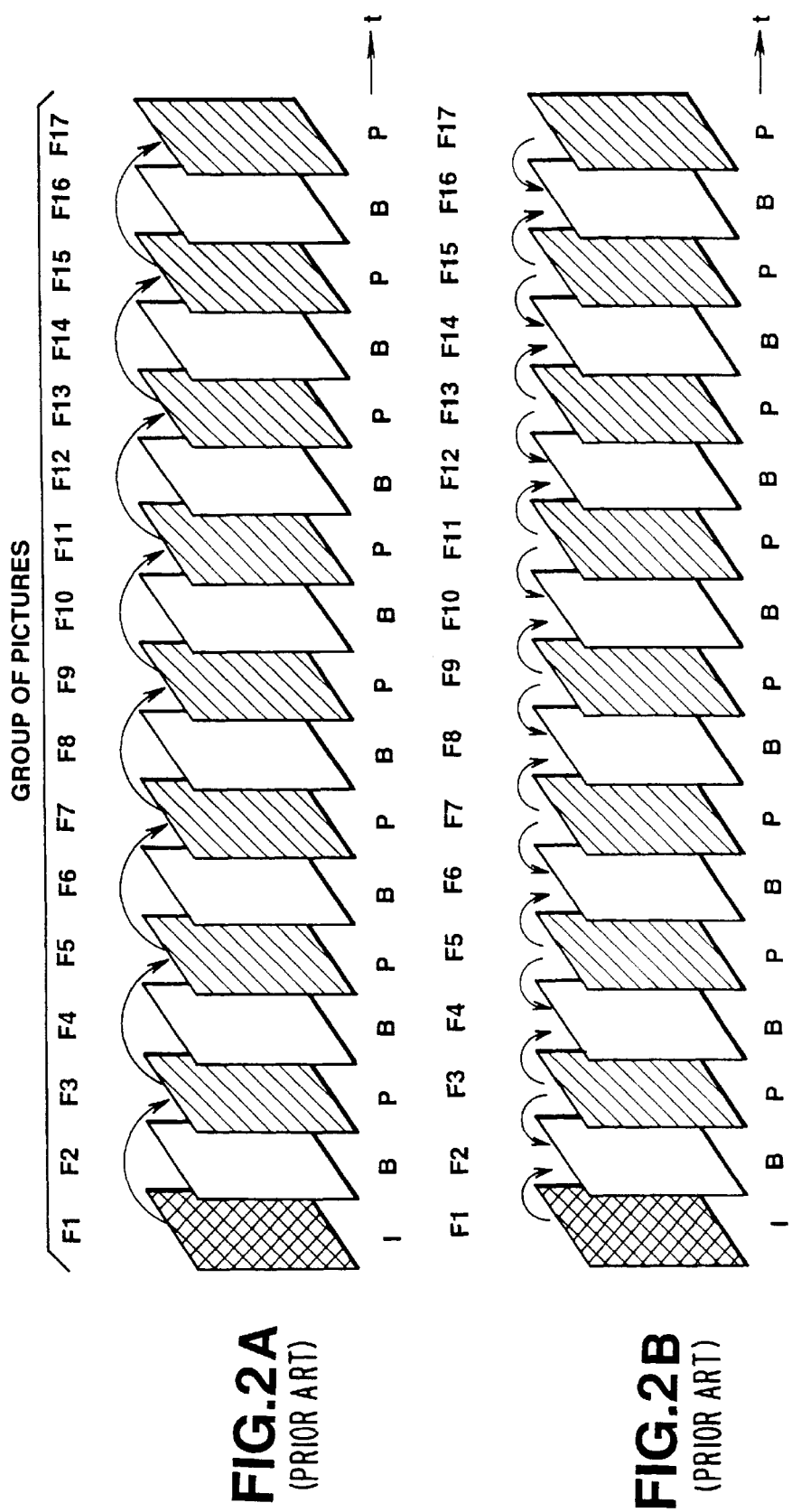
FIGS. 2A and 2B are diagrams illustrating types of pictures used in predictive encoding.
Figures 3A, 3B:
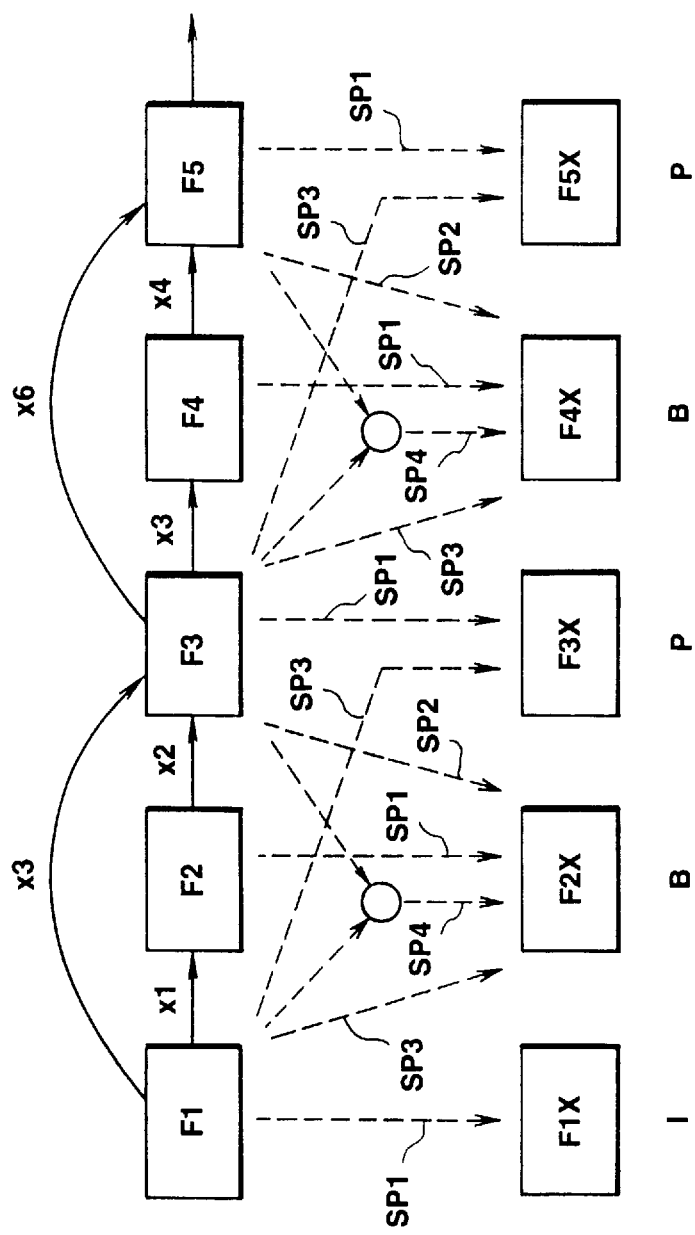
FIG. 3 is a diagram illustrating how picture signals are converted into encoded data for transmission.
Figure 4:
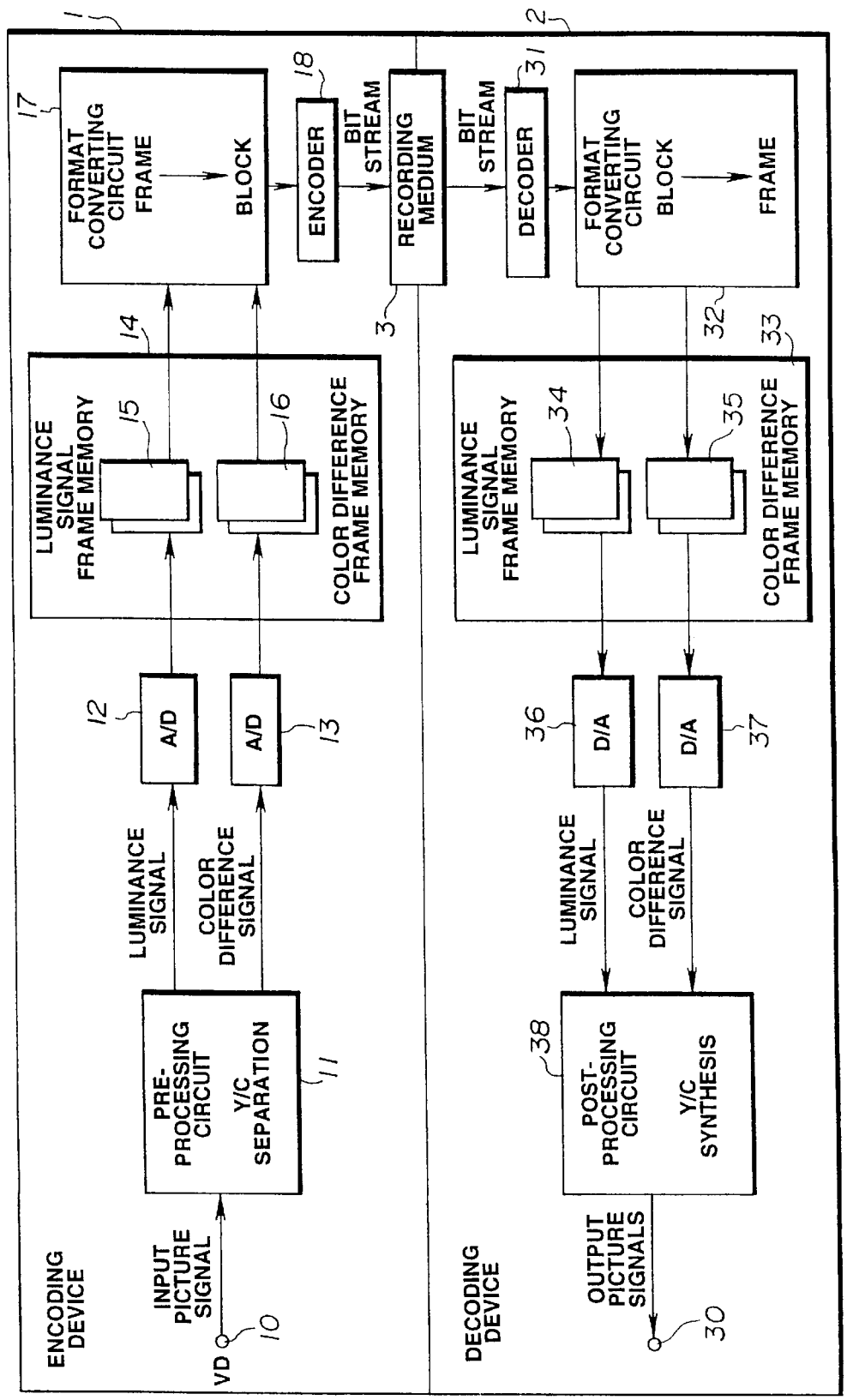
FIG. 4 is a block diagram showing a conventional device for encoding and decoding picture signals.
Figure 6:
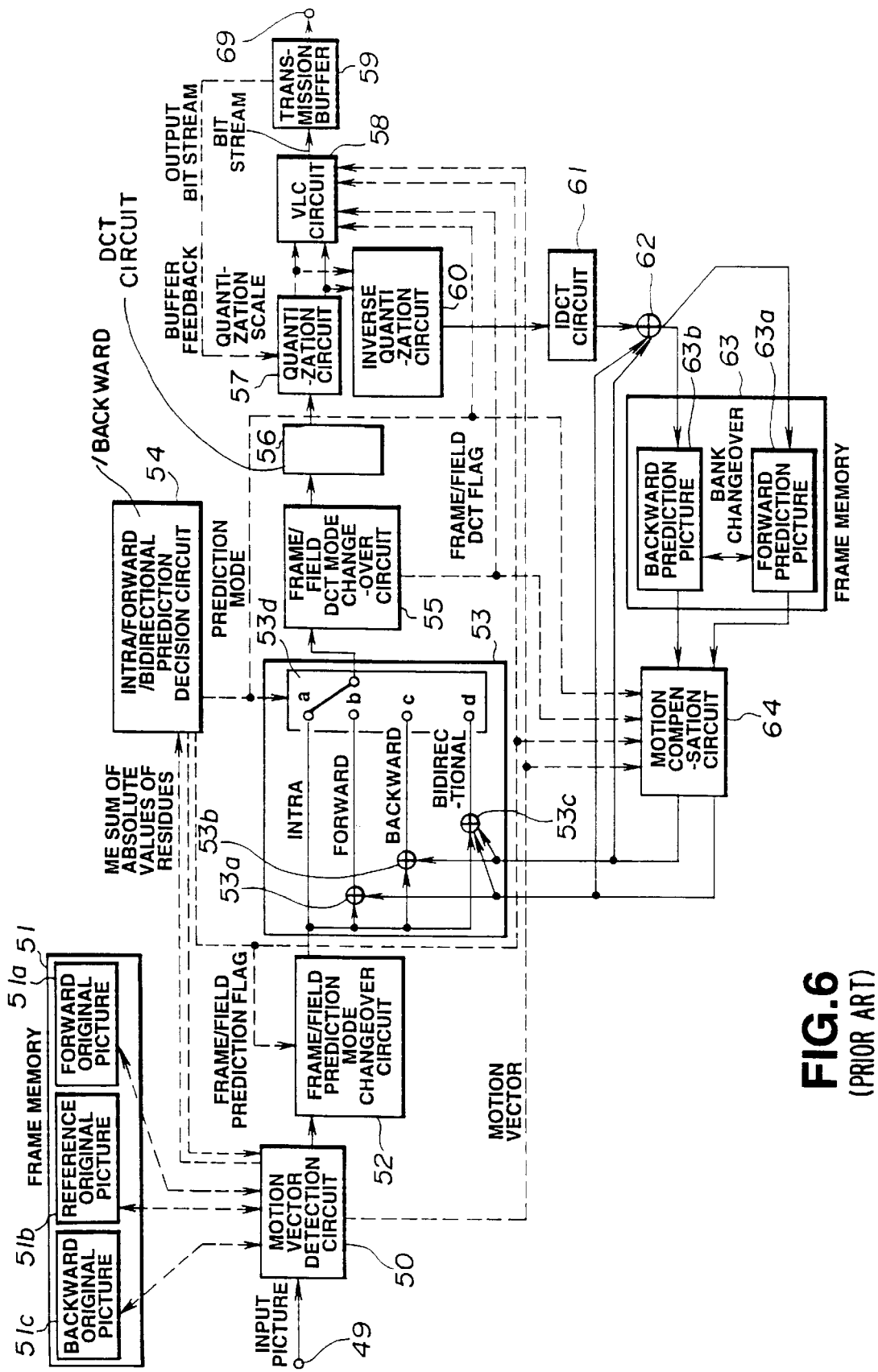
FIG. 6 is a block diagram showing the encoder of the device shown in FIG. 4.
Figures 7A, 7B:
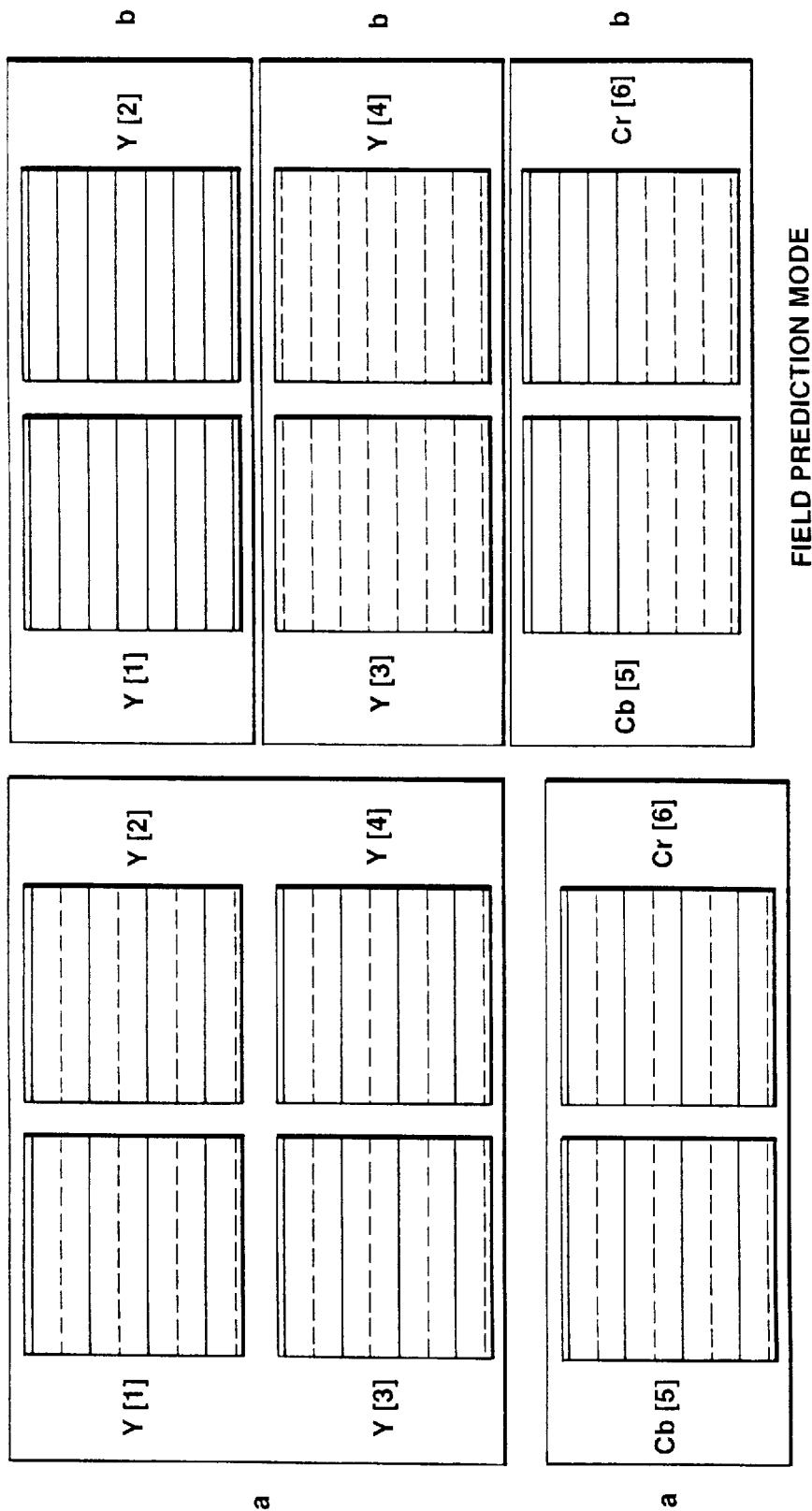
FIGS. 7A and 7B charts are referred to in explaining the predictive encoding operation of the encoder shown in FIG. 6.
Figures 8A, 8B:
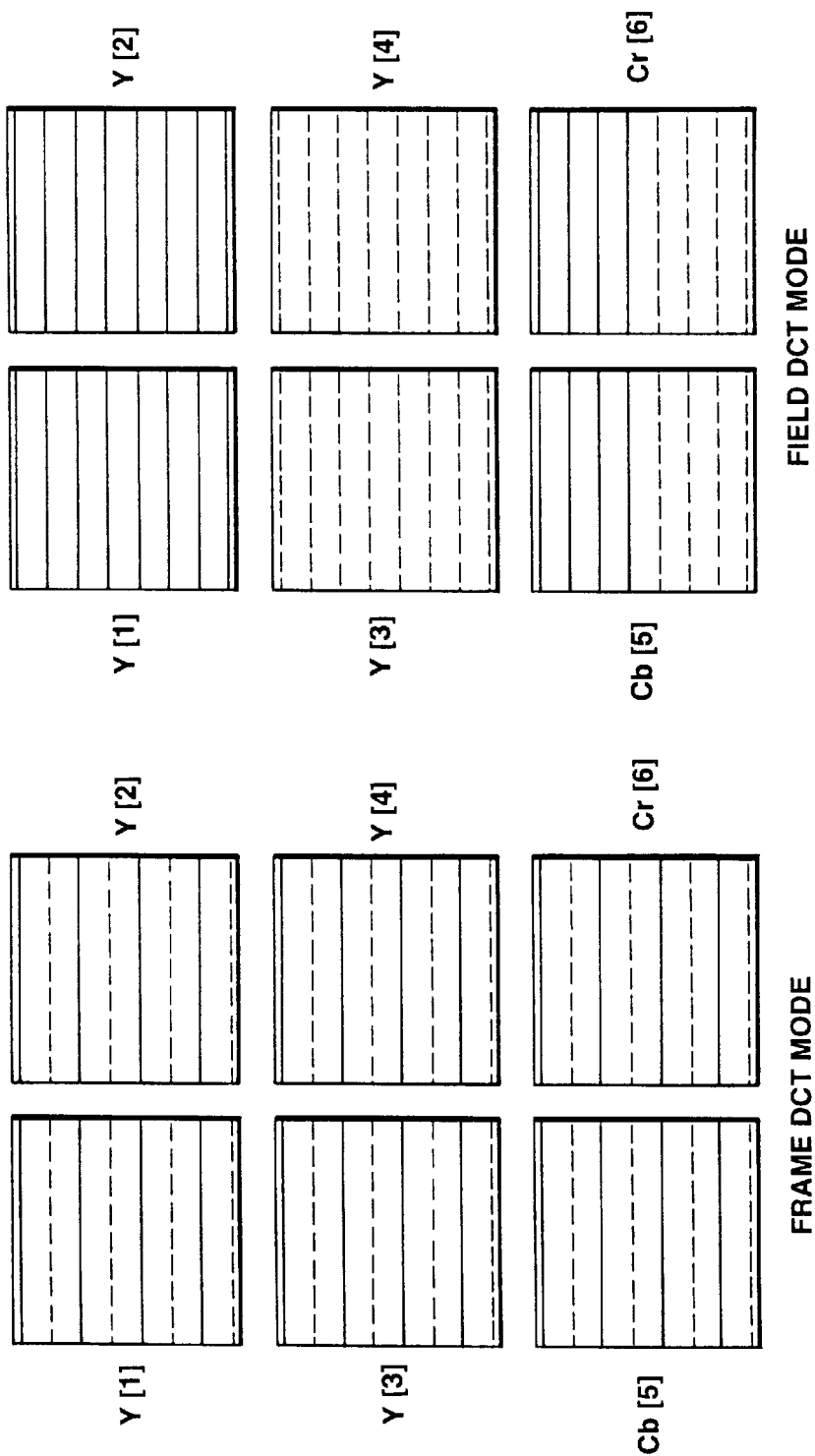
FIGS. 8A and 8B charts are referred to in explaining the orthogonal transformation operation of the encoder shown in FIG. 6.
Figure 9:
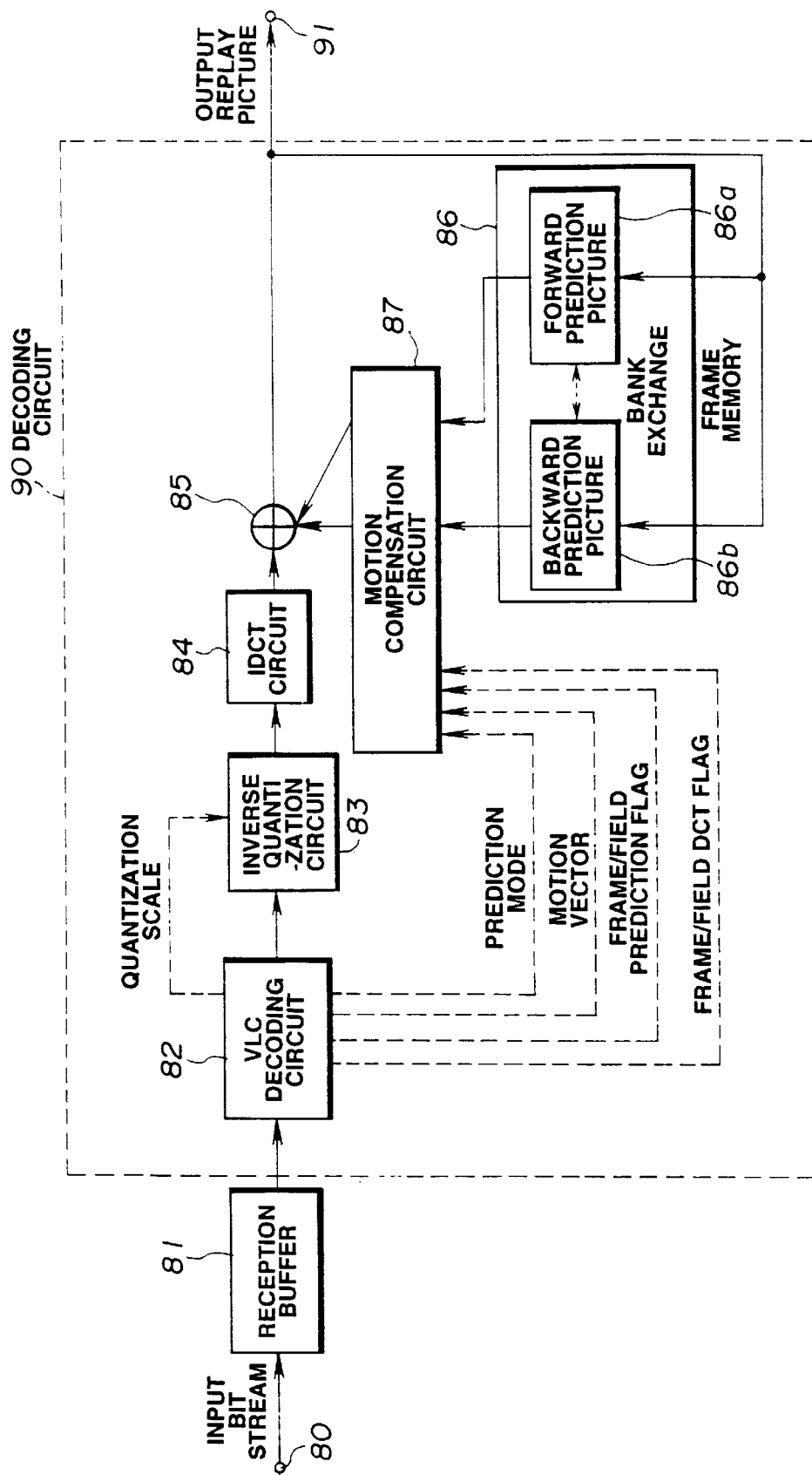
FIG. 9 is a block diagram showing the decoder of the device shown in FIG. 4.
Figure 11:
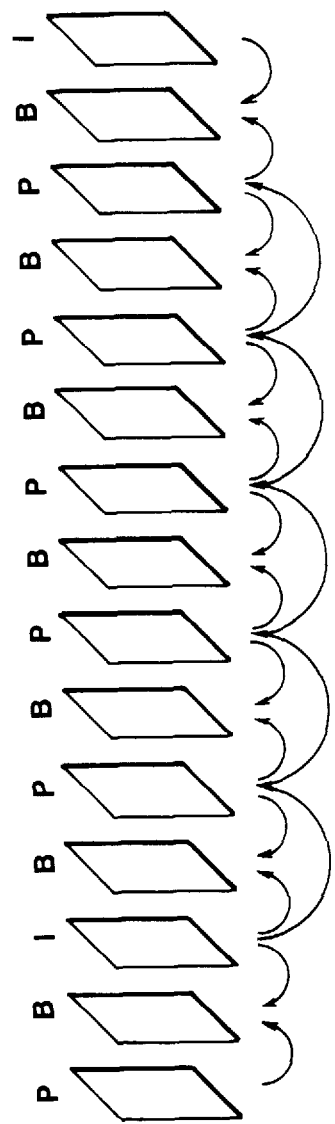
FIG. 11 is a chart referred to in explaining bi-directional prediction in the present invention.

FIG. 11 shows a picture sequence in which forward and bi-directional prediction are used. That is, the picture sequence is made up of I-pictures, P-pictures and B-pictures. For bi-directional prediction, two reference pictures are required. Conventionally, as shown in FIGS. 6 and 9, a forward prediction picture memory and a backward prediction picture memory are employed to encode and decode this sequence.

An embodiment of the present invention will now be described in which an encoder encodes a picture series so that it can be decoded by either a first type of decoder having a single prediction picture memory and capable only of intra-picture and forward predictive decoding, and a second type of decoder having two prediction picture memories and capable of intra-picture, forward, backward and bi-directional predictive decoding.

Figure 12:
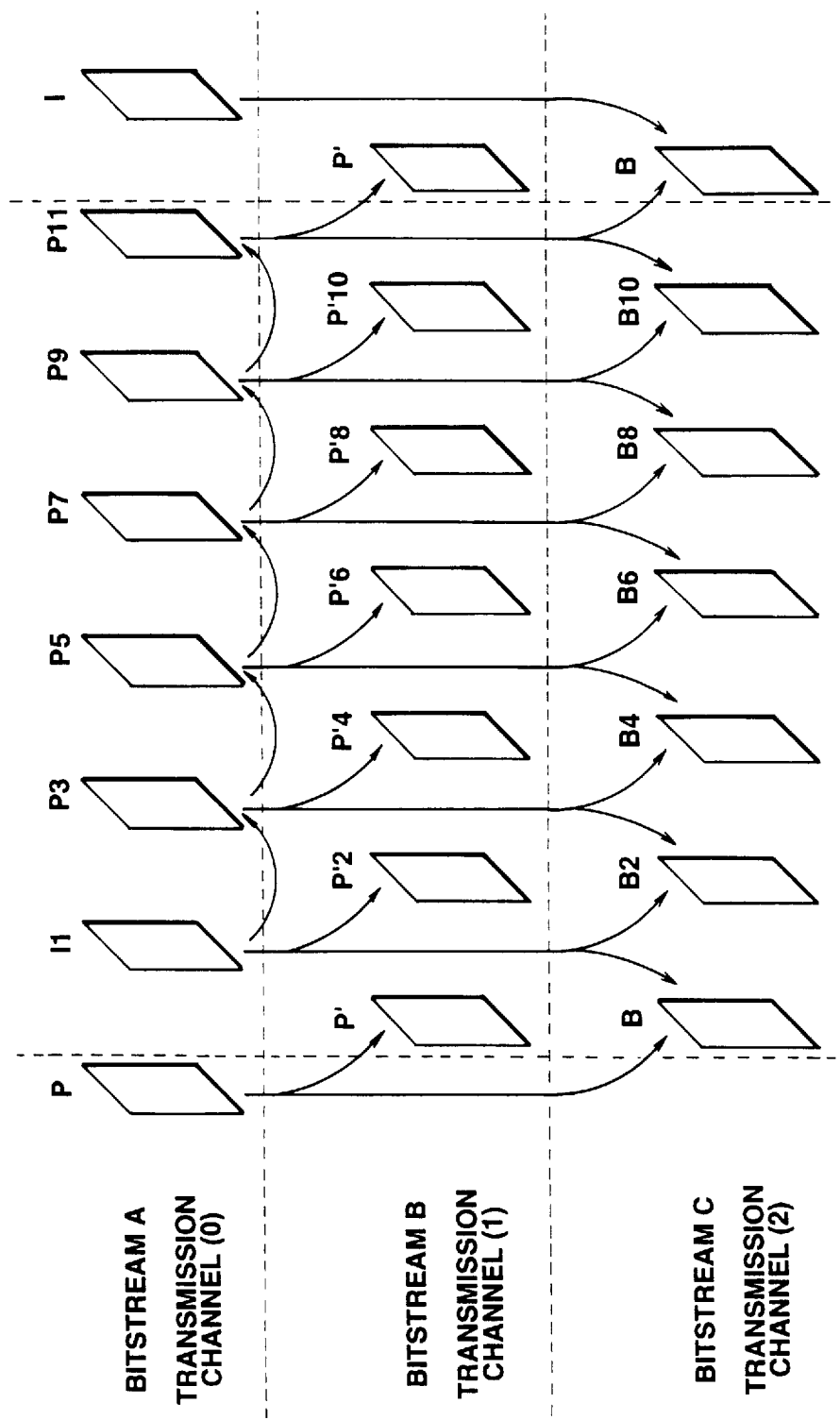
FIG. 12 is a chart referred to in explaining three bitstreams produced in an embodiment of the present invention.

FIG. 12 shows a bitstream according to the present invention. Here, a group of pictures comprises eleven frames.

The first frame is designated for intra-picture coding, and referred to as I1. The remainder of the odd-numbered frames in the original sequence are designated for forward predictive encoding and referred to as P3, P5, . . . P11. The first transmission channel, channel 0, contains the portion of the encoded bitstream, bitstream A, representing the odd-numbered frames I1, P3, P5, . . . P11. The distance between the pictures in bitstream A is the number of frames N which separate successive pictures in the bitstream, with N=2.

The remaining frames, that is, the even numbered frames of the original sequence, are represented in each of a second and third transmission channels, channels 1 and 2, respectively, which are interchangeably combined with channel 0.

In the second channel, the even-numbered frames of the original sequence are obtained by forward predictive encoding with reference to a temporally preceding frame in the first channel and are referred to as bitstream B comprising frames P', P'2, P'4, . . . P'10. A picture in the bitstream B includes macro-blocks each encoded by one of intra-coding and forward predictive coding. It will be appreciated that the pictures in bitstream A are used as reference pictures to predict pictures in bitstream A and pictures in bitstream B.

In the third channel, the even-numbered frames of the original sequence are obtained by bi-directional predictive encoding with reference to a temporally preceding frame and a temporally succeeding frame in the first channel and are referred to as bitstream C comprising frames B, B2, B4, . . . B10. A picture in the bitstream C includes macro-blocks each encoded by one of intra-coding, forward predictive coding, backward predictive coding and bi-directionally predictive coding. The first frame B is obtained by prediction from a frame in bitstream A in the preceding group of pictures and a frame in bitstream A in the current group of pictures. It will be appreciated that each of the pictures in bitstream A, except for the last picture in each group of bitstream A, are used as reference pictures to predict a picture in bitstream A and two pictures in bitstream C.

The number of memories required in the decoder depends upon which of the bitstreams are combined to form a decoded sequence of pictures. If the first and second bitstreams are combined, the decoder needs a memory capacity of only one frame.

The predictive capability required in the decoder depends upon which of the bitstreams are combined to form a decoded sequence of pictures. More particularly, if the bitstreams A and B are decoded, the decoder need be capable of only intra-picture and forward predictive decoding, and not backward or bi-directional predictive decoding. Therefore, the decoder may be simpler and less expensive to manufacture.

Figure 13:
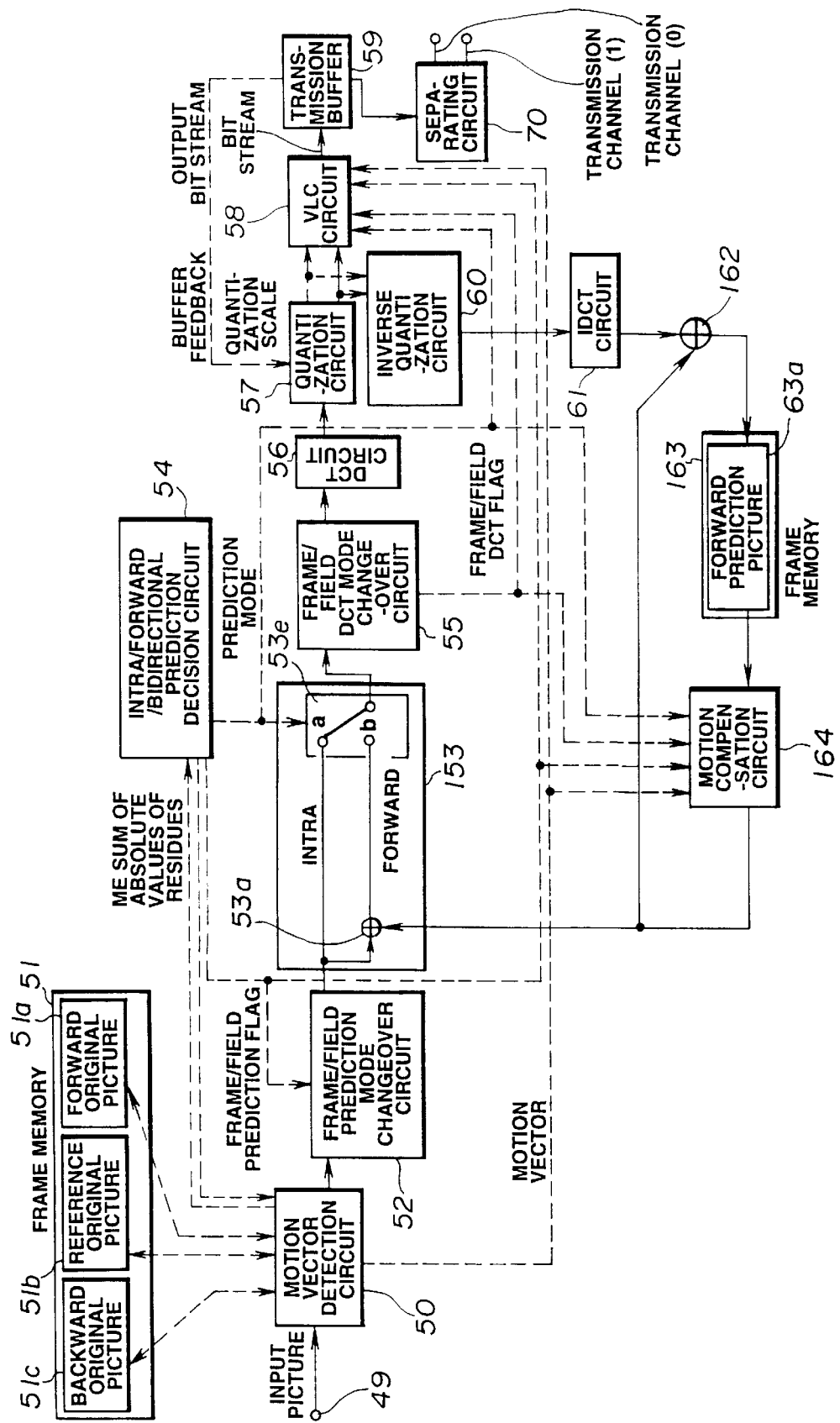
FIG. 13 is a block diagram showing an encoder according to an embodiment of the present invention.

FIG. 13 shows a block diagram of an encoder according to the present invention which serves to encode a series of pictures into bitstreams A and B of FIG. 12 using only forward prediction. In FIG. 13, the elements substantially identical to those shown in FIG. 6 are indicated by the same reference numerals and a description thereof is omitted.

The encoder shown in FIG. 13 has a single frame memory, the forward prediction picture unit 63a of frame memory 163. The encoder of FIG. 13 includes an arithmetic unit 153 having a switch 53e, and adapted to perform intra-picture prediction when input contact a of switch 53e is selected and forward prediction when input contact b of switch 53e is selected.

Encoding is carried out in the sequence I1, P'2, P3, P'4, P5, . . . as shown in FIG. 12. The picture data for bitstream B transmitted over the transmission channel 1 are not locally decoded as these pictures are not used to predict another picture. First, the picture I1 is encoded in the same manner as used by the encoder shown in FIG. 6. The quantization circuit 57 supplies quantized coefficient data representing the picture I1 to the variable length encoding circuit 58 and to the inverse quantization circuit 60. The inverse quantization circuit 60 and the IDCT circuit 61 locally decode the quantized coefficients and supply the recovered data to the frame memory 163.

The picture P'2 is then encoded, in the same manner as used by the encoder shown in FIG. 6, while the locally decoded picture I1 is stored in the frame memory 163 as the prediction picture. The quantization circuit 57 supplies quantized coefficient data representing the picture P'2 to only the variable length encoding circuit 58 and not to the inverse quantization circuit 60, so that the locally decoded picture I1 remains in the frame memory 163.

The picture P3 is then encoded in the same manner as used by the encoder shown in FIG. 6, while the locally decoded picture I1 is stored in the frame memory 163 as the prediction picture. The quantization circuit 57 supplies quantized coefficient data representing the picture P3 to the variable length encoding circuit 58 and to the inverse quantization circuit 60. The inverse quantization circuit 60, IDCT circuit 61 and the arithmetic unit 162 locally decode the quantization coefficients of P3 and apply the recovered data to the frame memory 163.

Encoding of the remaining pictures in the group of pictures occurs in a similar manner. The encoding sequence is thus seen to be I1, P'2, P3, P'4, P5, . . .

A separating circuit 70 separates the combined bitstream supplied from the transmission buffer 59 into the bitstream A for transmission over the transmission channel 0 and the bitstream B for transmission over the transmission channel 1.

Figure 22:
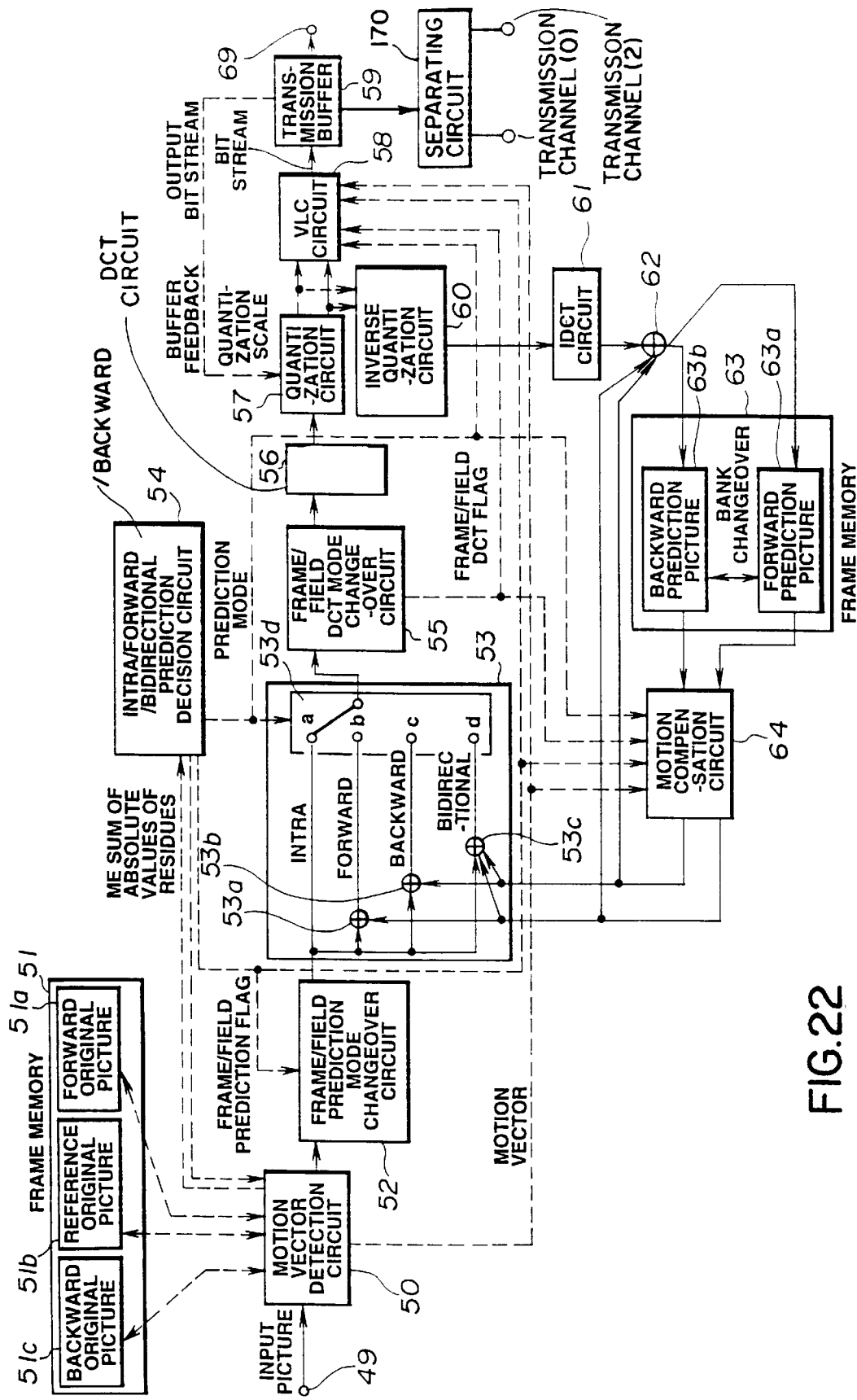
FIG. 22 is a block diagram of another encoder in accordance with the present invention.

To encode the pictures into the bitstream A and the bitstream C, the encoder must have sufficient memory capacity for two locally decoded reference pictures as shown, for example, in FIG. 6, namely, the forward prediction picture unit 63a and the backward prediction picture unit 63b. The encoding sequence is I1, P3, B2, P5, B4, P7 . . . However, in the present invention, the encoder of FIG. 6 is modified so as to include a separating circuit 170 after the transmission buffer 59 that serves to separate the combined bitstream supplied from the transmission buffer 59 into the bitstream A for transmission over the transmission channel 0 and the bitstream C for transmission over the transmission channel 2, as shown in FIG. 22, and to provide suitable delays so that the reference pictures in bitstream A are properly available for the pictures in bitstream C during decoding. If the bitstreams A, B and C are transmitted in parallel, the separating circuit 170 routes only the bitstream C to the transmission channel 2.

Figure 14:
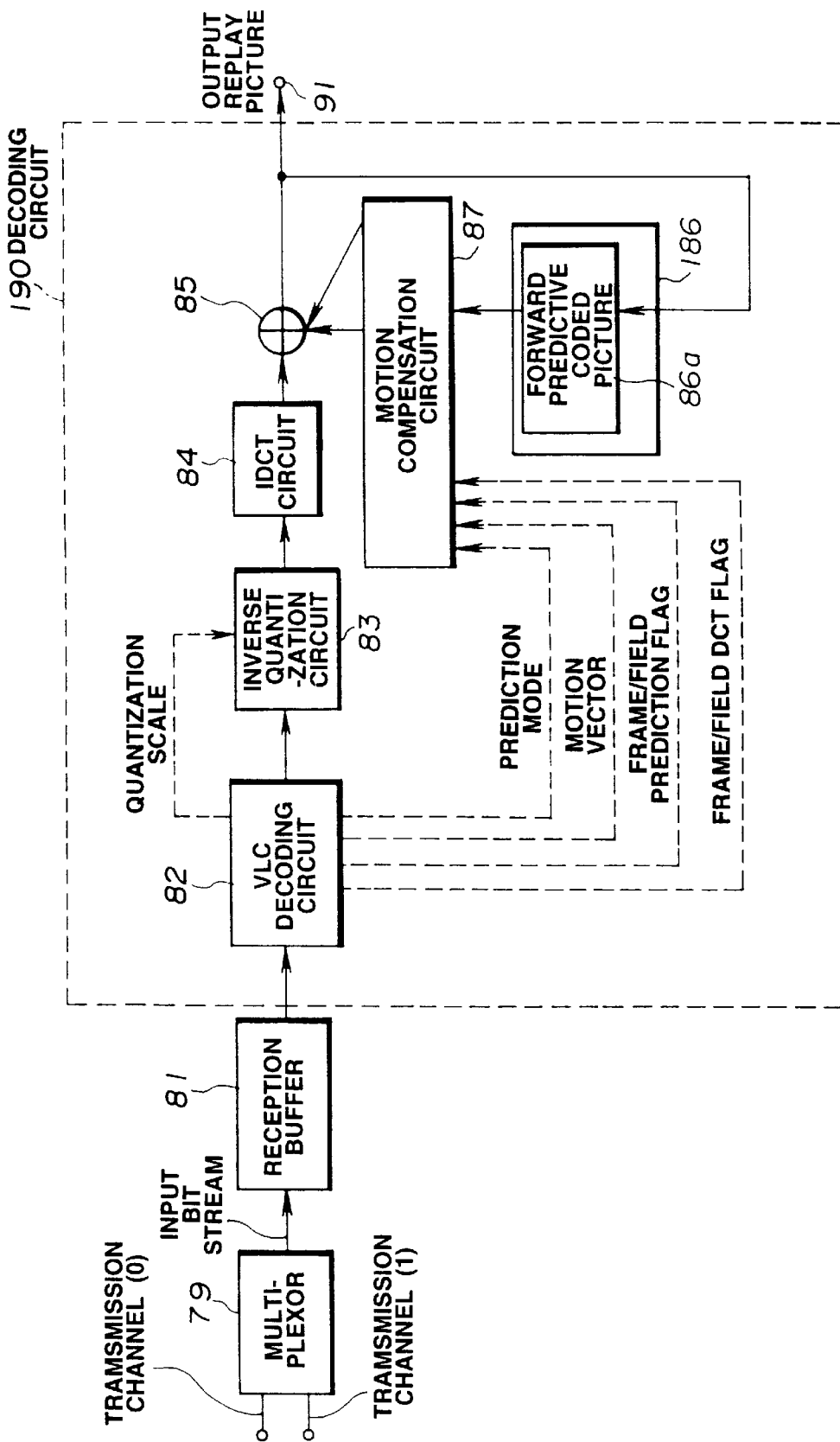
FIG. 14 is a block diagram showing a decoder according to an embodiment of the present invention.

FIG. 14 shows a block diagram of a decoder 190 according to the present invention which serves to decode a series of pictures encoded into bitstreams A and B of FIG. 12 using only intra-picture and forward predictive decoding. In FIG. 14, the elements identical to those shown in FIG. 9 are indicated by the same reference numerals and a description thereof is omitted.

The decoder 190 has a frame memory 186 having capacity for only a single picture, namely, the forward prediction picture unit 86a. The bitstreams A and B, transmitted over different channels, are supplied to a multiplexor 79 adapted to multiplex them to generate the combined bitstream A+B and to supply this bitstream to a reception buffer 81. Decoding is then performed in the same manner as explained with reference to the decoder shown in FIG. 9. The decoded pictures of the bitstream B, however, are not placed in the frame memory 186.

Figure 23:
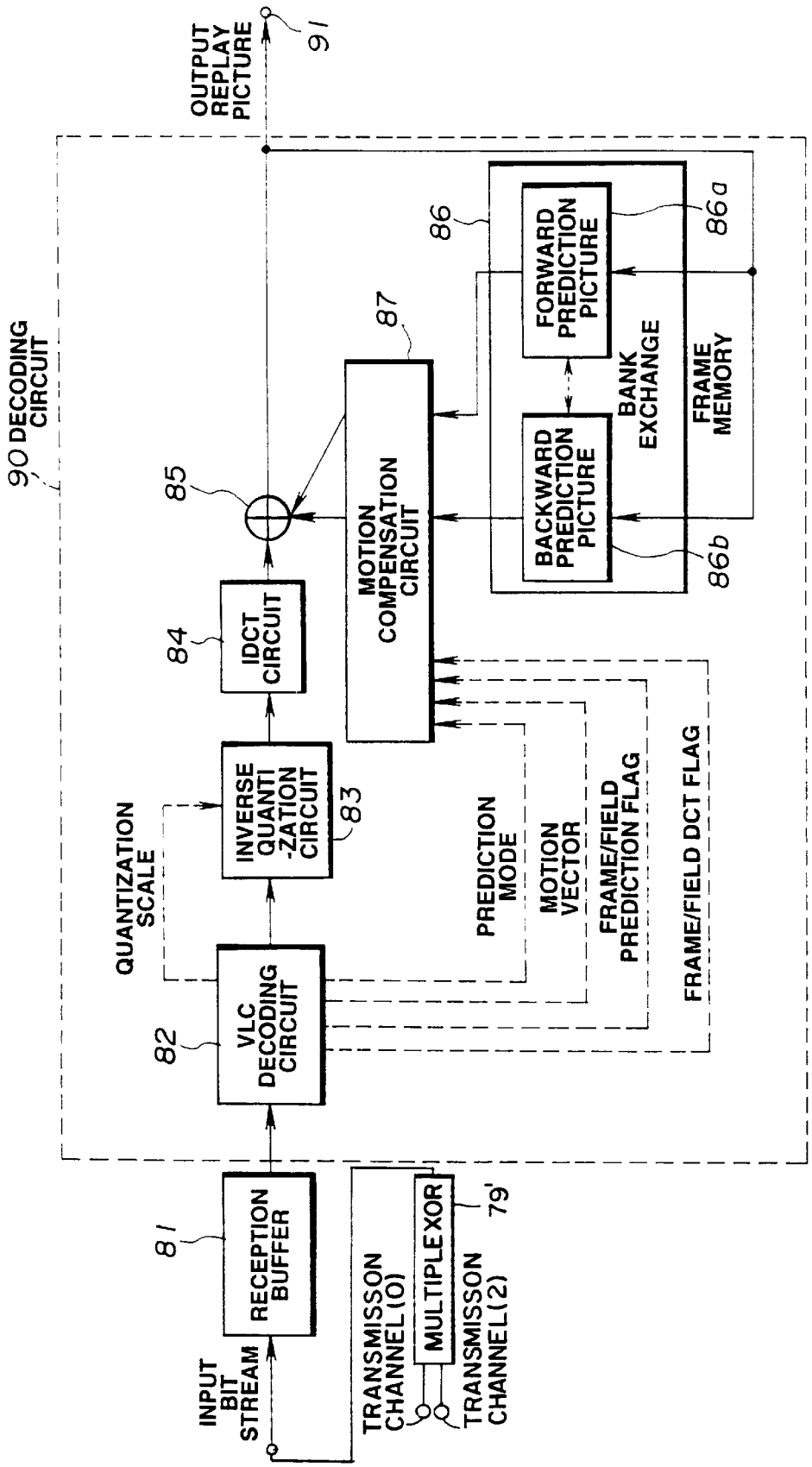
FIG. 23 is a block diagram of another decoder in accordance with the present invention.

To decode the bitstreams A and C, the decoder must have two reference picture memories and be capable of bi-directional predictive decoding, such as the decoder of FIG. 9. However, in the present invention, the decoder of FIG. 9 is modified so as to include a multiplexor 79' before the reception buffer 81 which serves to multiplex the bitstreams A and C, transmitted over different channels, to produce a combined bitstream A+C as show in FIG. 23.

The bitstreams are now discussed in more detail, and a technique for improving their efficiency is presented.

Figure 15:
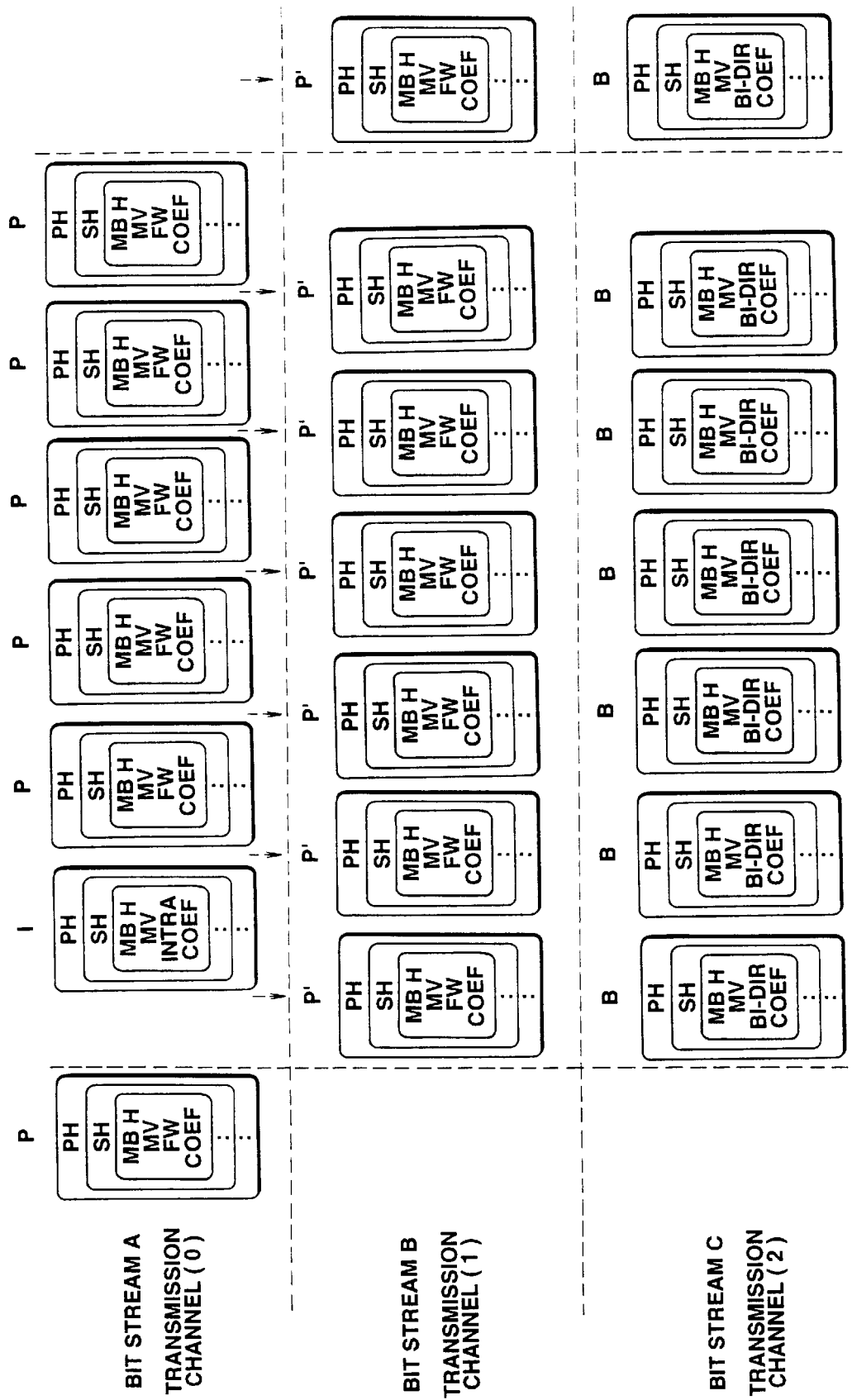
FIG. 15 is a chart referred to in explaining the bitstreams produced in an embodiment of the present invention.

The bitstreams according to the present invention are transmitted in accordance with the so-called simulcast system, that is, in parallel, as shown in FIG. 15.

Every other picture I, P, P, . . . is represented in the bitstream A on the transmission channel 0. Each picture has a picture header PH, a slice header SH and a macro-block header MB H, in accordance with the hierarchical picture structure encoding format. Each macro-block includes motion vector data MV, prediction mode data and DCT coefficient data COEF. The header information is generated by the VLC circuit 58 in accordance with the other data supplied thereto, as described above with reference to FIG. 6.

The remaining pictures not represented in the bitstream A are represented in the bitstream B as pictures P', P', . . . on the transmission channel 1. The P' picture data is identical in construction to the picture data of the bitstream A as described above, and is produced by prediction with reference to the pictures in the bitstream A.

The remaining pictures not represented in the bitstream A are also represented in the bitstream C as pictures B', B', . . . on the transmission channel 2. The B picture data is identical in construction to the picture data of the bitstream A or B as described above, and is produced by prediction with reference to the two decoded pictures of the bitstream A which temporally surround the respective B pictures.

The pictures I, P', P, P', P, . . . are reproduced by decoding the bitstreams A and B transmitted over separate channels. Decoding uses a single picture memory because only forward predictive decoding, indicated by FW in the macro-blocks of bitstreams A and B of FIG. 15, is used.

If the bitstream C is substituted for the bitstream B, the pictures I, B, P, B, P, . . . transmitted over different channels, may be reproduced. Two picture memories are required for decoding because bi-directional predictive decoding, indicated by BI-DIR in the macro-blocks of bitstream C of FIG. 15, is used.

A technique for increasing the encoding efficiency of the simulcast bitstreams, referred to herein as the priority break point (PBP) technique, will now be explained.

Figure 16:
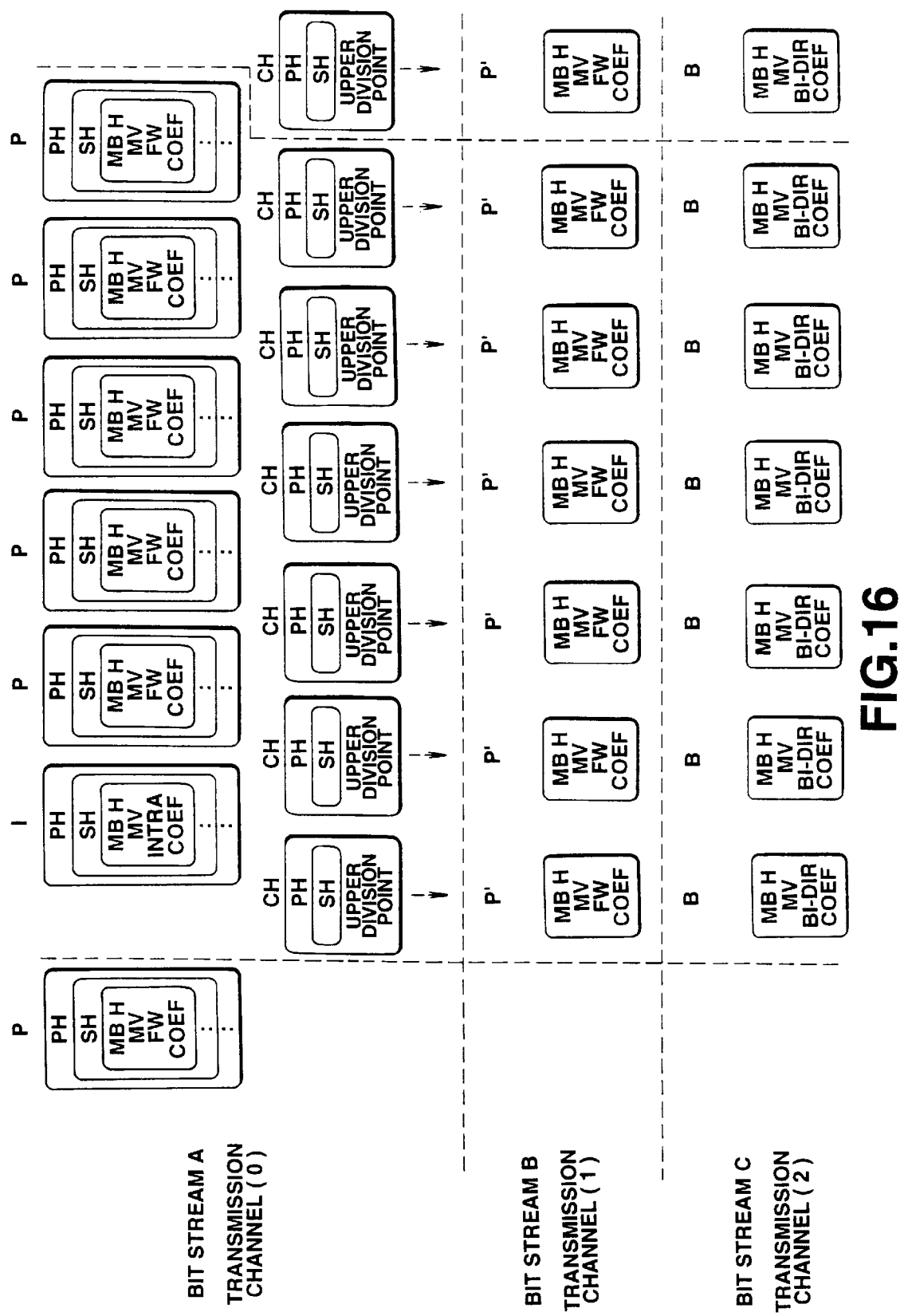
FIG. 16 is a chart illustrating the application of the priority break point technique to the bitstreams shown in FIG. 15.

FIG. 16 shows the simulcast bitstreams, after application of the PBP technique.

The bitstream A of FIG. 16 includes the information as shown in FIG. 15, and also includes common header information CH for the pictures which are not represented in the bitstream A, namely, the pictures represented in each of the bitstreams B and C. Specifically, the common header information CH comprises the picture and slice headers for the pictures of bitstreams B and C, as described above with respect to FIG. 15, which is common to the bitstreams B and C. Each slice header includes PBP information indicating the point up to which information is sent.

By varying the PBP information, it is possible to transmit, in channel 0, only the header information or to transmit up to the motion vector for each macro-block in bitstreams B and C. The remaining information for bitstreams B and C is transmitted in channels 1 and 2, respectively. In the example shown in FIG. 16, the PBP information indicates that the transmission for each macro-block is performed up to the slice header. The encoder in the present embodiment comprises the encoder described above with respect to the simulcast system, modified so that its separating circuit not only separates the coded data but also adds the PBP information to each slice header.

Data lower in the hierarchical encoding format than the macro-block layer, excluding the common header, of P' pictures not represented in the bitstream A are represented in the bitstream B in the sequence P', P', P', . . .

Data lower in the hierarchical encoding format than the macro-block layer, excluding the common header, of B pictures not represented in the bitstream A are represented in the bitstream C in the sequence B, B, B . . .

The pictures I, P', P, P', P, . . . are reproduced by decoding the bitstreams A and B. The header information for the P' pictures is extracted from the decoded bitstream A, while data below the macro-block layer is decoded from the bitstream B. Decoding requires only a single picture memory because only intra-picture and forward predictive decoding are performed.

If the bitstream C is substituted for the bitstream B, the pictures I, B, P, B, P, . . . are reproduced by decoding the bitstreams A and C. The header information for the B pictures is extracted from the decoded bitstream A, while data below the macro-block layer is decoded from the bitstream C. Decoding requires two picture memories because bi-directional predictive decoding, inter alia, may be performed.

Another embodiment of the present invention will now be described in which an encoder encodes a picture series so that it can be decoded by either a first type of decoder having a single prediction picture memory and capable of only intra-picture, forward and backward predictive decoding, and a second type of decoder having two prediction picture memories and capable of bi-directional predictive decoding.

Figure 17:
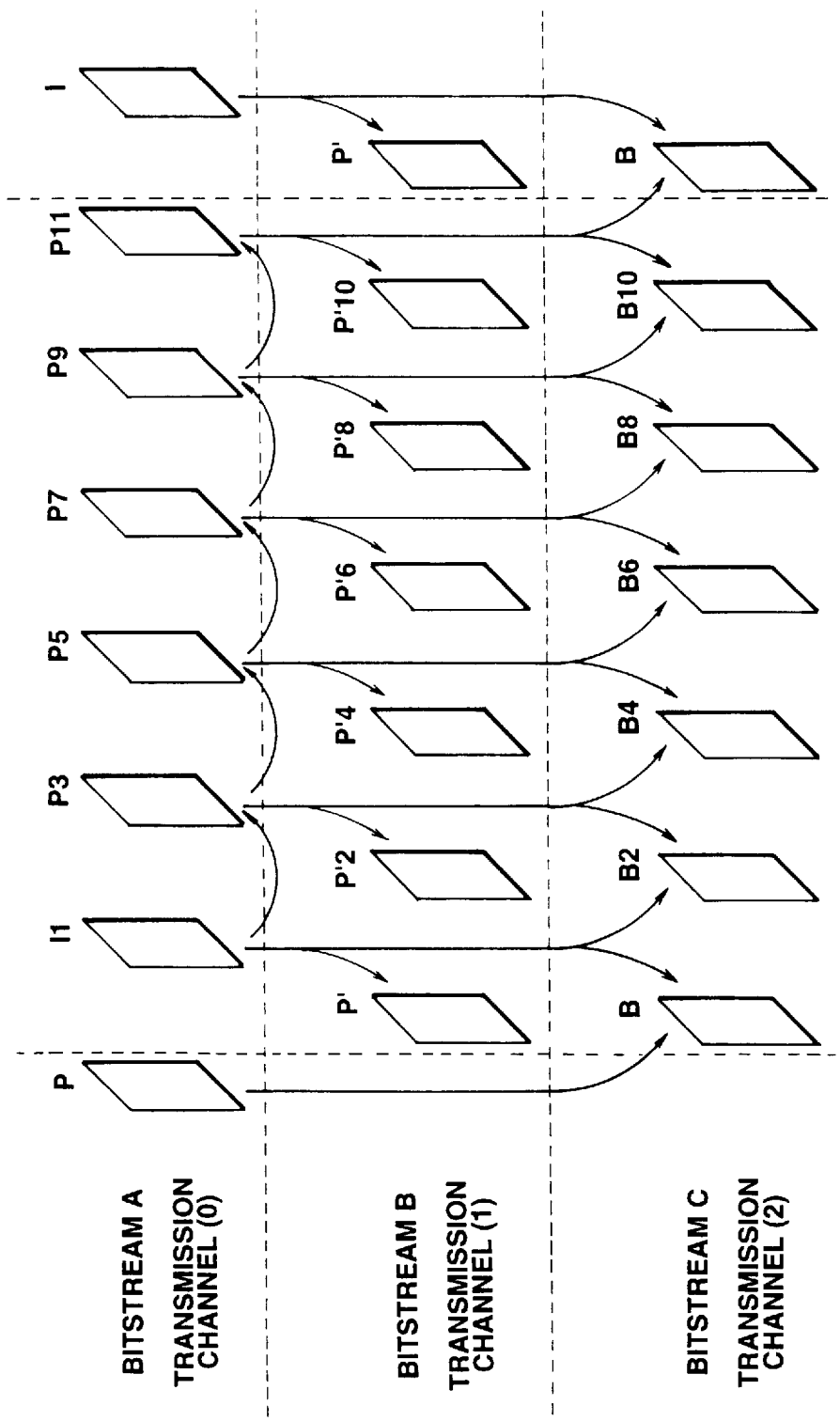
FIG. 17 is a chart referred to in explaining three bitstreams produced in another embodiment of the present invention.

FIG. 17 shows another bitstream according to the present invention which is similar to the bitstream shown in FIG. 12 except that the pictures represented in the bitstream B are generated by backward predictive encoding from the pictures in the bitstream A. The bitstreams B and C are interchangeably combined with the bitstream A to decode the series of pictures. That is, a picture in the bitstream B includes macro-blocks each encoded by one of intra-coding and backward predictive coding, while a picture in the bitstream C includes macro-blocks each encoded by one of intra-coding, forward predictive coding, backward predictive coding and bi-directionally predictive coding.

Figure 18:
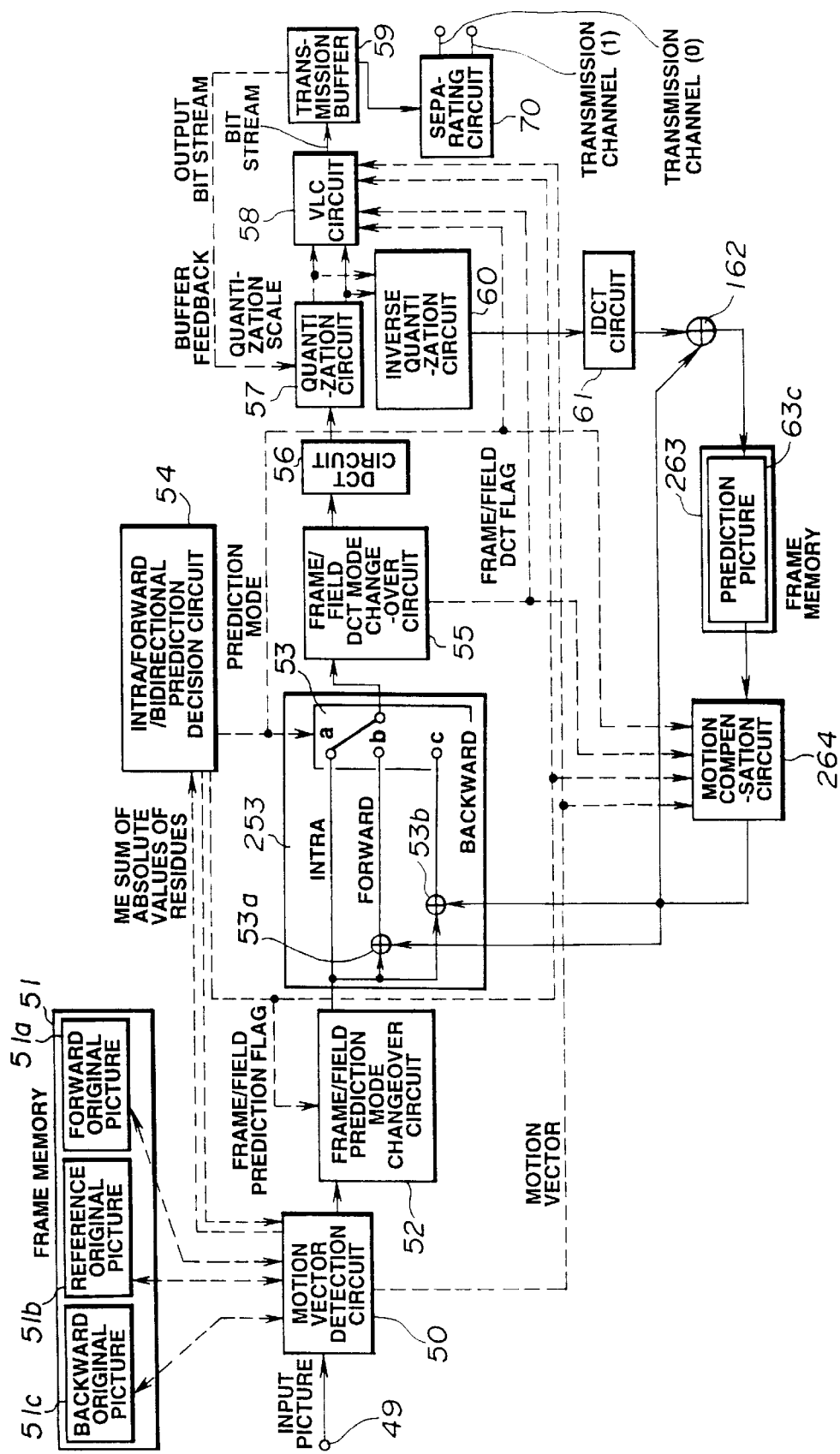
FIG. 18 is a block diagram showing an encoder according to another embodiment of the present invention.

FIG. 18 shows a block diagram of an encoder according to the present invention which serves to encode a series of pictures into bitstreams A and B of FIG. 17 using only intra-picture, forward and backward prediction. In FIG. 18, the elements identical to those shown in FIG. 6 are indicated by the same reference numerals and a description thereof is omitted.

The encoder shown in FIG. 18 has a single frame memory 263 including a prediction picture unit 63c. The encoder of FIG. 18 includes an arithmetic unit 253 having a switch 53f, and adapted to perform intra-picture prediction when input contact a of switch 53f is selected, forward prediction when input contact b of switch 53f is selected, and backward prediction when input contact c of switch 53f is selected.

Encoding is carried out in the sequence I1, P', P3, P'2, P5, P'4, . . . as shown in FIG. 17. The picture data for bitstream B transmitted over the transmission channel 1 are not decoded locally as these pictures are not used to predict another picture. First, the picture I1 is encoded in the same manner as used by the encoder shown in FIG. 6. The quantization circuit 57 supplies quantized coefficient data representing the picture I1 to the variable length encoding circuit 58 and to the inverse quantization circuit 60. The inverse quantization circuit 60 and the IDCT circuit 61 locally decode the quantized coefficients and supply the recovered data to the frame memory 263.

The picture P' is then encoded, in the same manner as used by the encoder shown in FIG. 6, while the locally decoded picture I1 is stored in the frame memory 263 as the prediction picture. The quantization circuit 57 supplies quantized coefficient data representing the picture P' to only the variable length encoding circuit 58 and not to the inverse quantization circuit 60, so that the locally decoded picture I1 remains in the frame memory 263.

The picture P3 is then encoded in the same manner as used by the encoder shown in FIG. 6, while the locally decoded picture I1 is stored in the frame memory 263 as the prediction picture. The quantization circuit 57 supplies quantized coefficient data representing the picture P3 to the variable length encoding circuit 58 and to the inverse quantization circuit 60. The inverse quantization circuit 60, IDCT circuit 61 and the arithmetic unit 162 locally decode the quantization coefficients of P3 and apply the recovered data to the frame memory 263.

Encoding of the remaining pictures in the group of pictures occurs in a similar manner.

In this manner, in the arrangement shown in FIG. 18, the bitstream is produced which consists of the bitstream A resulting from only intra-picture and forward prediction and the bitstream B resulting from only backward prediction.

A separating circuit 70 separates the combined bitstream supplied from the transmission buffer 59 into the bitstream A for transmission over the transmission channel 0 and the bitstream B for transmission over the transmission channel 1.

To encode the pictures into the bitstream A and the bitstream C, the encoder must have sufficient memory capacity for two locally decoded prediction pictures as shown, for example, in FIG. 6, namely, the forward prediction picture unit 63a and the backward prediction picture unit 63b. However, in the present invention, the encoder of FIG. 6 is modified so as to include a separating circuit 170 after the transmission buffer 59 that serves to separate the combined bitstream supplied from the transmission buffer 59 into the bitstream A for transmission over the transmission channel 0 and the bitstream C for transmission over the transmission channel 2. If the bitstreams A, B and C are transmitted in parallel, the separating circuit 170 routes only the bitstream C to the transmission channel 2. The encoding sequence is I1, B, P3, B2, P5, B4, P7, . . .

Figure 19:
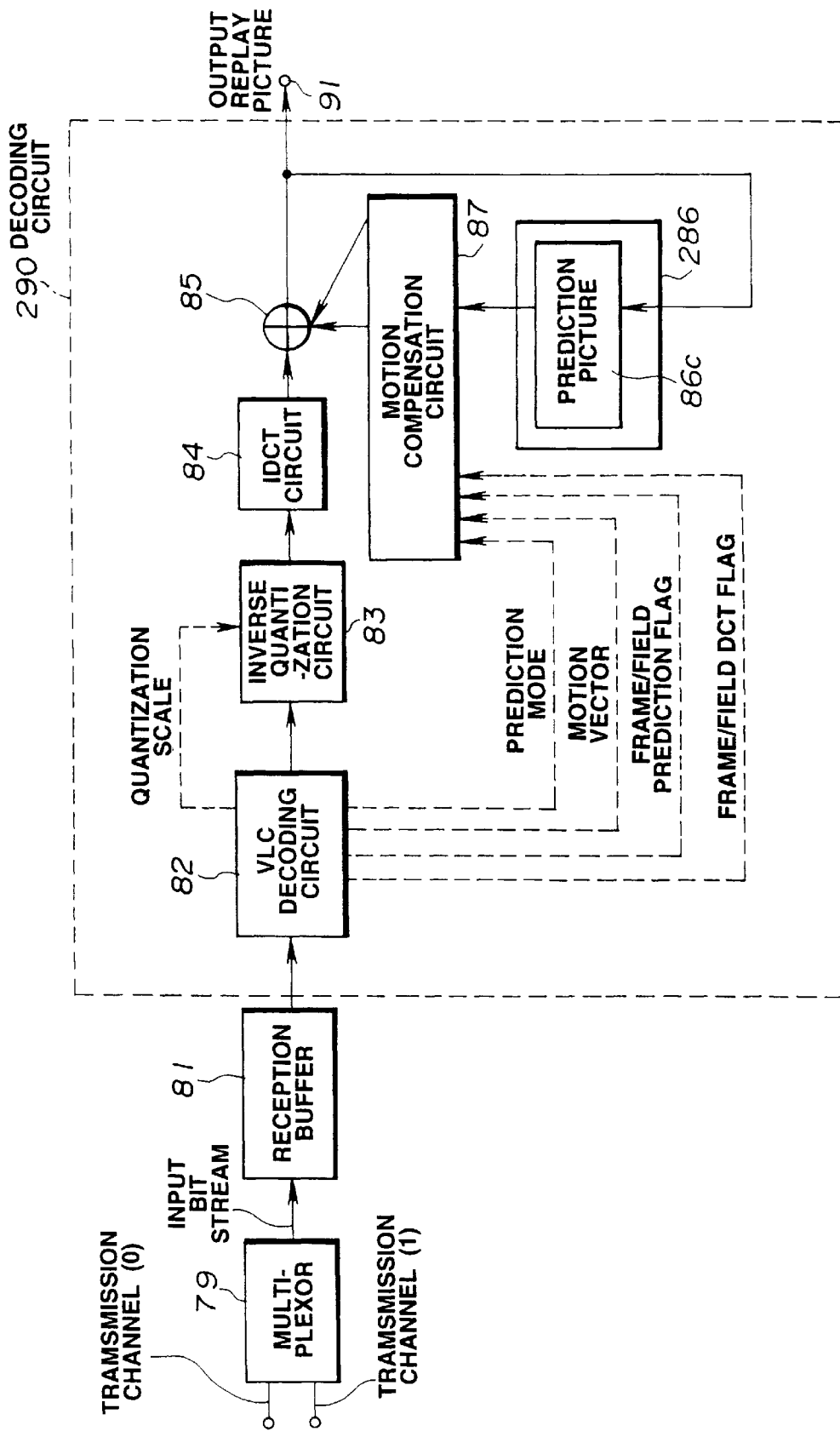
FIG. 19 is a block diagram showing a decoder according to another embodiment of the present invention.

FIG. 19 shows a block diagram of a decoder 290 according to the present invention which serves to decode a series of pictures encoded into bitstreams A and B of FIG. 17 using only intra-picture, forward and backward predictive decoding. In FIG. 19, the elements identical to those shown in FIG. 9 are indicated by the same reference numerals and a description thereof is omitted.

The decoder 290 has a frame memory 286 having capacity for only a single picture, namely, the prediction picture unit 86c. The bitstreams A and B, transmitted over different channels, are supplied to a multiplexor 79 adapted to multiplex them to generate the combined bitstream A+B and to supply this bitstream to a reception buffer 81. Decoding is then performed in the same manner as explained with reference to the decoder shown in FIG. 9. The decoded pictures of the bitstream B, however, are not placed in the frame memory 286.

To decode the bitstreams A and C, the decoder must have two reference picture memories and be capable of bi-directional predictive decoding, such as the decoder of FIG. 9. However, in the present invention, the decoder of FIG. 9 is modified so as to include a multiplexor before the reception buffer 81 which serves to multiplex the bitstreams A and C, transmitted over different channels, to produce a combined bitstream A+C.

Figure 20:
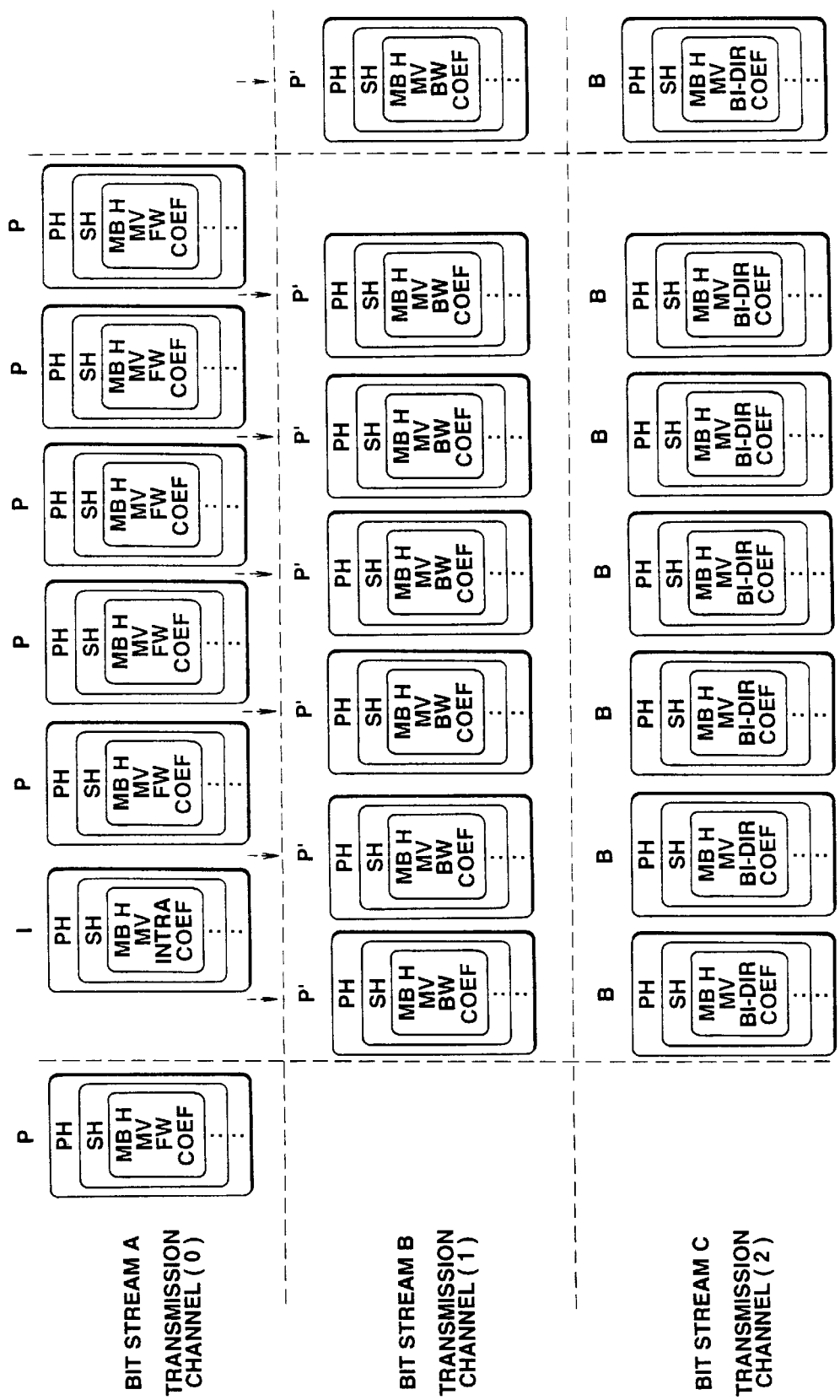
FIG. 20 is a chart referred to in explaining the bitstreams produced in another embodiment of the present invention.

The bitstreams according to the present invention are transmitted in accordance with the so-called simulcast system, that is, in parallel, as shown in FIG. 20. The bitstreams in FIG. 20 are similar to those shown in FIG. 15 and discussed above, except that the bitstream B includes coefficient data produced by backward predictive encoding, indicated by BW in the macro-blocks of bitstream B of FIG. 20.

The bitstreams A and B of FIG. 20 may be decoded using only a single picture memory because bi-directional predictive decoding is not used. To decode the bitstreams A and C of FIG. 20, a memory having capacity for two pictures is required because bi-directional predictive decoding is used.

Figure 21:
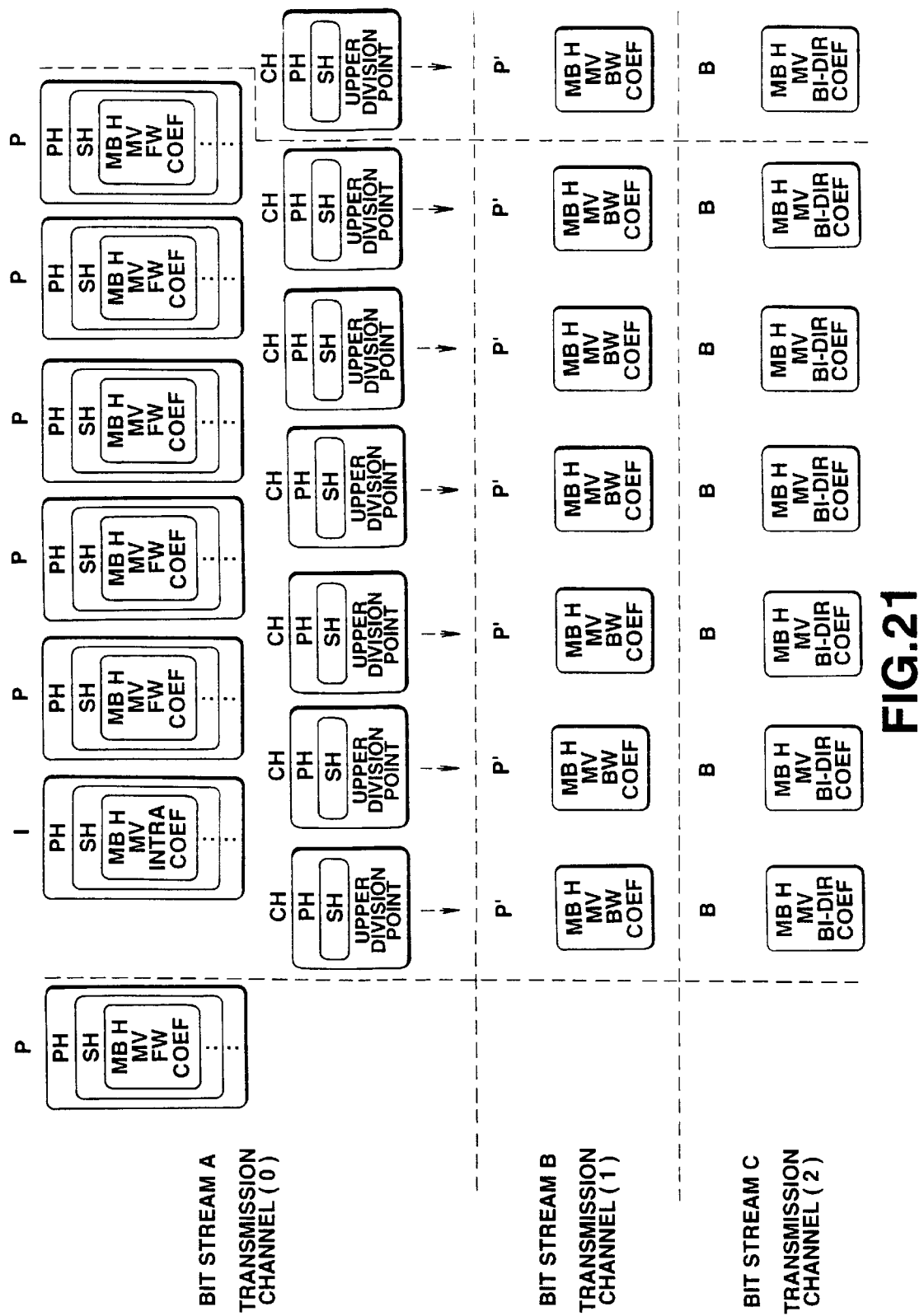
FIG. 21 is a chart illustrating the application of the priority break point technique to the bitstreams shown in FIG. 20.

FIG. 21 shows the simulcast bitstreams of FIG. 20, after application of the PBP technique for increasing the encoding efficiency of the simulcast bitstreams. The bitstreams in FIG. 21 are similar to those shown in FIG. 16 and discussed above, except that the bitstream B includes coefficient data produced by backward predictive decoding, indicated by BW in the macro-blocks of bitstream B of FIG. 21.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for transmitting groups of picture signals, comprising the steps of:

encoding a portion of said groups of picture signals by forward predictive encoding with reference to a preceding picture signal in said portion to generate a first bitstream;

encoding the picture signals in said groups of picture signals which are not included in said portion by one of forward and backward predictive encoding with reference to the picture signals in said portion to generate a second bitstream; and transmitting said first bitstream and said second bitstream in parallel.

2. The method of claim 1 further comprising the steps of: encoding the picture signals in said groups of picture signals which are not included in said portion by bi-directional predictive encoding with reference to the picture signals in said portion to generate a third bitstream; and transmitting said third bitstream in parallel with one of said first and second bitstreams.

3. The method of claim 2 further comprising the steps of: generating header information for one of said second bitstream and said third bitstream; placing a portion of said header information into said first bitstream; and placing a remainder of said header information into said one of said second and third bitstreams.

4. The method of claim 1 further comprising the steps of: generating header information for said second bitstream; placing a portion of said header information into said first bitstream; and placing a remainder of said header information into said second bitstream.

5. The method of claim 1 wherein said portion of said groups of picture signals comprises every Nth of said groups of picture signals, N being an integer.

6. A method for transmitting groups of picture signals, comprising the steps of:
   encoding a portion of said groups of picture signals by forward predictive encoding with reference to a preceding picture signal in said portion to generate a first bitstream;
   encoding the picture signals in said groups which are not included in said portion by bi-directional predictive encoding with reference to the picture signals in said portion to generate a second bitstream; and
   transmitting said first bitstream and said second bitstream in parallel.

7. The method of claim 6 further comprising the steps of: generating header information for said second bitstream; placing a portion of said header information into said first bitstream; and placing a remainder of said header information into said second bitstream.

8. An apparatus for transmitting groups of picture signals, comprising:
   means for encoding a portion of said groups of picture signals by forward predictive encoding with reference to a preceding picture signal in said portion to generate a first bitstream;
   means for encoding the picture signals in said groups of picture signals which are not included in said portion by one of forward and backward predictive encoding with reference to the picture signals in said portion to generate a second bitstream; and
   means for transmitting said first bitstream and said second bitstream in parallel.

9. The apparatus of claim 8 further comprising: means for encoding the picture signals in said groups of picture signals which are not included in said portion by bi-directional predictive encoding with reference to the picture signals in said portion to generate a third bitstream; and means for transmitting said third bitstream in parallel with one of said first and second bitstreams.

10. The apparatus of claim 9 further comprising: means for generating header information for one of said second bitstream and said third bitstream; and means for placing a portion of said header information into said first bitstream and for placing a remainder of said header information into said one of said second and third bitstreams.

11. The apparatus of claim 8 further comprising: means for generating header information for said second bitstream; and means for placing a portion of said header information into said first bitstream and for placing a remainder of said header information into said second bitstream.

12. The apparatus of claim 8 wherein said portion of said groups of picture signals comprises every Nth of said groups of picture signals, N being an integer.

13. An apparatus for transmitting groups of picture signals, comprising:
   means for encoding a portion of said groups of picture signals by forward predictive encoding with reference to a preceding picture signal in said portion to generate a first bitstream;
   means for encoding the picture signals in said groups which are not included in said portion by bi-directional predictive encoding with reference to the picture signals in said portion to generate a second bitstream; and
   means for transmitting said first bitstream and said second bitstream in parallel.

14. The apparatus of claim 13 further comprising: means for generating header information for said second bitstream; and means for placing a portion of said header information into said first bitstream and for placing a remainder of said header information into said second bitstream.

15. An encoded picture signal representing groups of original picture signals, produced by:
   encoding a portion of said groups of original picture signals by forward predictive encoding with reference to a preceding picture signal in said portion to generate a first bitstream;
   encoding the picture signals in said groups of original picture signals which are not included in said portion by one of forward and backward predictive encoding with reference to the picture signals in said portion to generate a second bitstream; and
   arranging said first bitstream and said second bitstream in parallel, thereby producing said encoded picture signal.

16. A method for decoding first and second encoded picture signals transmitted in parallel, comprising the steps of:
   combining said first and second encoded picture signals;
   decoding said first encoded picture signals by forward predictive decoding with reference to a preceding decoded picture signal decoded from said first encoded picture signals to generate first decoded picture signals; and
   decoding said second encoded picture signals by one of forward and backward predictive decoding with reference to said first decoded picture signals to generate second decoded picture signals.

17. The method of claim 16, further comprising the step of extracting header information for said second encoded picture signals from said first encoded picture signals; and wherein said step of decoding said second encoded picture signals uses the extracted header information.

18. The method of claim 16, wherein the step of decoding said first encoded picture signals places said first decoded picture signals into a memory having a capacity of one frame; and the step of decoding said second encoded picture signals reads the first decoded picture signals placed in said memory to decode said second encoded picture signals.

19. A method for decoding first and second encoded picture signals transmitted in parallel, comprising the steps of:
   combining said first and second encoded picture signals;

decoding said first encoded picture signals by forward predictive decoding with reference to a preceding decoded picture signal decoded from said first encoded picture signals to generate first decoded picture signals; and decoding said second encoded picture signals by bi-directional predictive decoding with reference to said first decoded picture signals to generate second decoded picture signals.

20. The method of claim 19, further comprising the step of extracting header information for said second encoded picture signals from said first encoded picture signals; and wherein said step of decoding said second encoded picture signals uses the extracted header information.

21. An apparatus for decoding first and second encoded picture signals transmitted in parallel, comprising:

means for combining said first and second encoded picture signals;

means for decoding said first encoded picture signals by forward predictive decoding with reference to a preceding decoded picture signal decoded from said first encoded picture signals to generate first decoded picture signals; and means for decoding said second encoded picture signals by one of forward and backward predictive decoding with reference to said first decoded picture signals to generate second decoded picture signals.

22. The apparatus of claim 21, further comprising means for extracting header information for said second encoded picture signals from said first encoded picture signals; and wherein said means for decoding said second encoded picture signals uses the extracted header information to decode said second encoded picture signals.

23. The apparatus of claim 21, further comprising a memory having a capacity of one frame; and wherein said means for decoding said first encoded picture signals places said first decoded picture signals in said memory; and said means for decoding said second encoded picture signals reads the first decoded picture signals placed in said memory to decode said second encoded picture signals.

24. An apparatus for decoding first and second encoded picture signals transmitted in parallel, comprising:

means for combining said first and second encoded picture signals;

means for decoding said first encoded picture signals by forward predictive decoding with reference to a preceding decoded picture signal decoded from said first encoded picture signals to generate first decoded picture signals; and means for decoding said second encoded picture signals by bi-directional predictive decoding with reference to said first decoded picture signals to generate second decoded picture signals.

25. The apparatus of claim 24, further comprising means for extracting header information for said second encoded picture signals from said first encoded picture signals; and wherein said means for decoding said second encoded picture signals uses the extracted header information.

* * * * *